US009826107B2

(12) United States Patent
Masui

(10) Patent No.: US 9,826,107 B2
(45) Date of Patent: Nov. 21, 2017

(54) INFORMATION PROCESSING SYSTEM FOR UPDATING FUNCTION SETTINGS IN A FIRST PRINTER WITH FUNCTION SETTING DATA RECEIVED FROM A SECOND PRINTER

(71) Applicant: FUJI XEROX CO., LTD., Tokyo (JP)

(72) Inventor: Takanori Masui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/885,338

(22) Filed: Oct. 16, 2015

(65) Prior Publication Data

US 2016/0337531 A1 Nov. 17, 2016

(30) Foreign Application Priority Data

May 11, 2015 (JP) .................. 2015-096474

(51) Int. Cl.
*H04N 1/00* (2006.01)
*H04N 1/40* (2006.01)
*H04N 1/44* (2006.01)

(52) U.S. Cl.
CPC ..... *H04N 1/00114* (2013.01); *H04N 1/00344* (2013.01); *H04N 1/00347* (2013.01); *H04N 1/00352* (2013.01); *H04N 1/00411* (2013.01); *H04N 1/00514* (2013.01); *H04N 1/40* (2013.01); *H04N 1/4406* (2013.01); *H04N 2201/0094* (2013.01)

(58) Field of Classification Search
CPC .................................................. H04N 1/00514
See application file for complete search history.

(56) References Cited

U.S. PATENT DOCUMENTS

| 8,213,028 | B2* | 7/2012 | Ikeda | H04N 1/00222 358/1.13 |
| 2009/0238213 | A1* | 9/2009 | Kasatani | H04N 1/00344 370/503 |
| 2011/0231701 | A1* | 9/2011 | Aoki | G03G 15/5079 714/15 |
| 2016/0277241 | A1* | 9/2016 | Nakamori | H04L 41/0813 |
| 2017/0046105 | A1* | 2/2017 | Masui | G06F 3/1222 |

FOREIGN PATENT DOCUMENTS

JP 2008-097253 A 4/2008

* cited by examiner

*Primary Examiner* — Benjamin O Dulaney
(74) *Attorney, Agent, or Firm* — Sughrue Mion, PLLC

(57) ABSTRACT

An information processing system includes a first information processing apparatus and a second information processing apparatus that use setting information. The first information processing apparatus includes a transmission unit that transmits information including at least function identification information and user identification information to the second information processing apparatus, the function identification information identifying a function for which first setting information is used, and the user identification information identifying a user associated with the function identification information. The second information processing apparatus includes a request unit that makes a request for the first setting information to the first information processing apparatus in a case where second setting information is stored in the second information processing apparatus; and an update unit that updates the second setting information in accordance with the first setting information that has been transmitted from the first information processing apparatus.

17 Claims, 18 Drawing Sheets

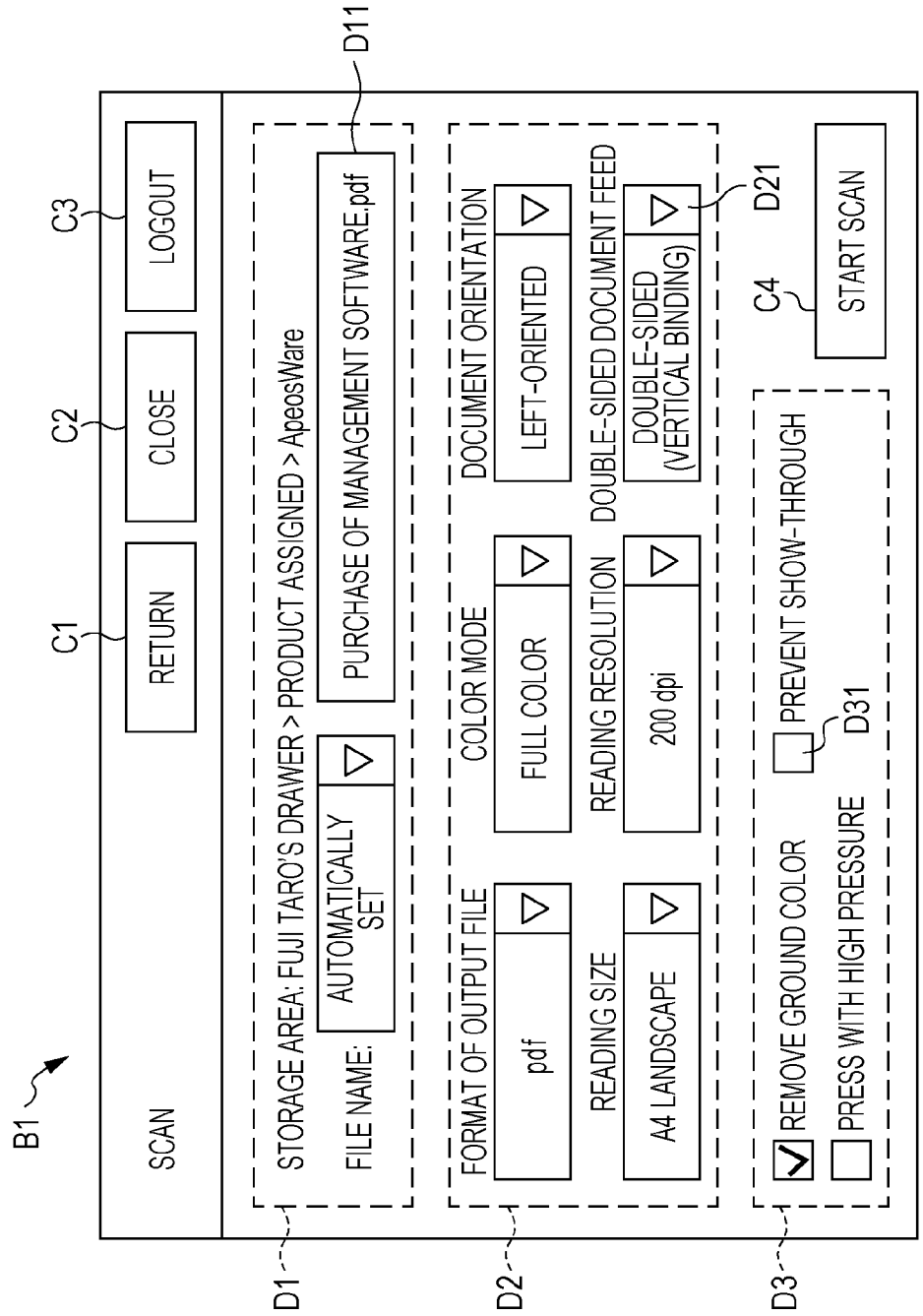

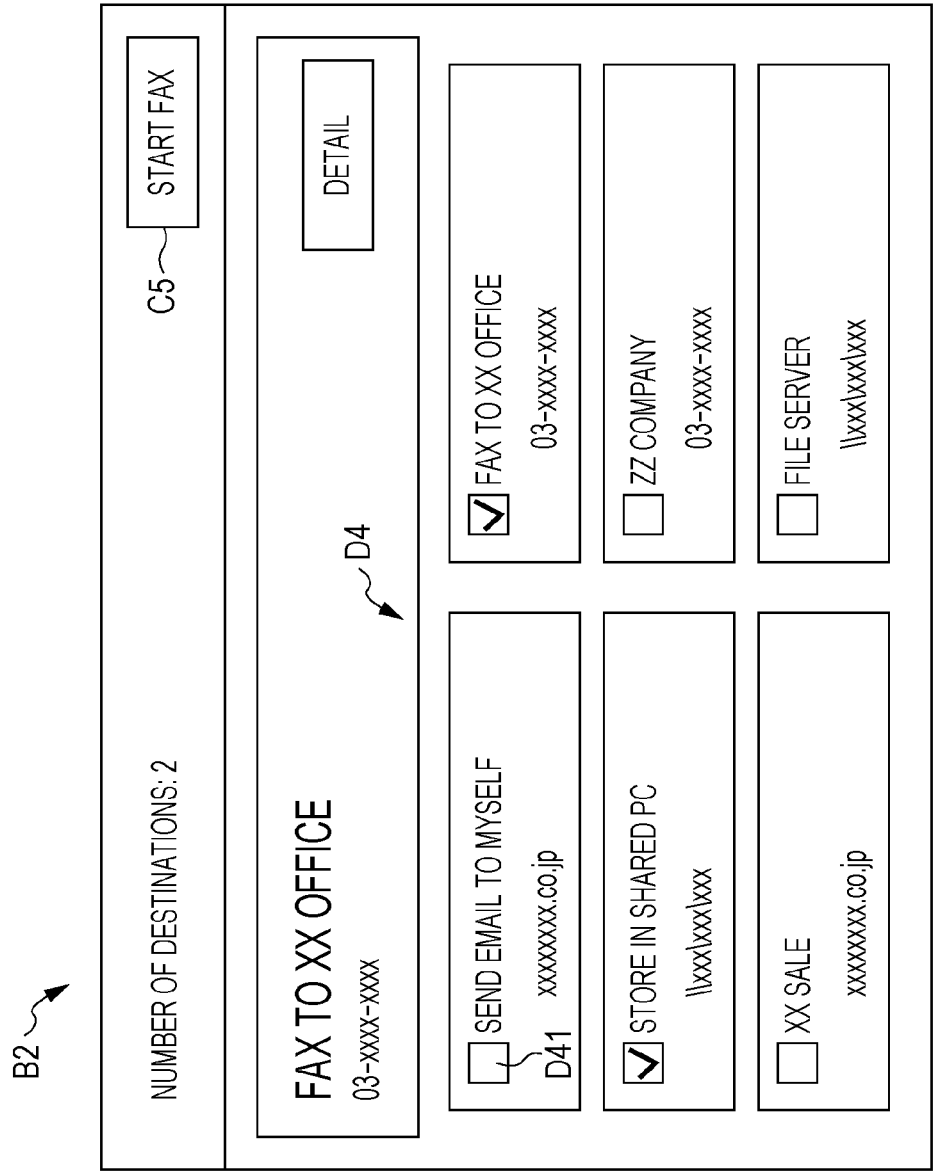

FIG. 7A

| PLUG-IN ID | USER ID | SETTING INFORMATION | | | TIME STAMP |
|---|---|---|---|---|---|
| | | FOLDER NAME | FILE NAME | .. | |
| P001 (TRANSFER SCAN FILE) | U001 (USER A) | APPROVAL DOCUMENT | PURCHASE OF MANAGEMENT SOFTWARE | .. | 3/1/20XX 15:00 |
| P001 (TRANSFER SCAN FILE) | U001 (USER A) | APPROVAL DOCUMENT | CONCLUSION OF MAINTENANCE CONTRACT | .. | 2/25/20XX 14:30 |
| P001 (TRANSFER SCAN FILE) | U001 (USER A) | TRANSPORTATION COST | RECEIPT OF FUJI HOTEL | .. | 2/10/20XX 10:30 |
| ... | ... | ... | ... | .. | ... |

FIG. 7B

| PLUG-IN ID | USER ID | SETTING INFORMATION | | | TIME STAMP |
|---|---|---|---|---|---|
| | | COLOR MODE | NUMBER OF COPIES (TOTAL) | .. | |
| P002 (CLOUD PRINT) | U003 (USER C) | MONOCHROME | 50 | .. | 3/1/20XX 10:00 |
| P002 (CLOUD PRINT) | U002 (USER B) | COLOR | 20 | .. | 3/3/20XX 14:30 |
| P002 (CLOUD PRINT) | U002 (USER B) | COLOR | 10 | .. | 3/2/20XX 10:30 |
| ... | ... | ... | ... | .. | ... |

FIG. 7C

| PLUG-IN ID | USER ID | SETTING INFORMATION | | · · | TIME STAMP |
|---|---|---|---|---|---|
| | | FOLDER NAME | FILE NAME | | |
| P001 (TRANSFER SCAN FILE) | U001 (USER A) | TRANSPORTATION COST | RECEIPT OF FUJI HOTEL | · · | 2/10/20XX 10:30 |

FIG. 7D

| PLUG-IN ID | USER ID | SETTING INFORMATION | | · · | TIME STAMP |
|---|---|---|---|---|---|
| | | FOLDER NAME | FILE NAME | | |
| P001 (TRANSFER SCAN FILE) | U001 (USER A) | APPROVAL DOCUMENT | PURCHASE OF MANAGEMENT SOFTWARE | · · | 3/1/20XX 15:00 |
| P001 (TRANSFER SCAN FILE) | U001 (USER A) | APPROVAL DOCUMENT | CONCLUSION OF MAINTENANCE CONTRACT | · · | 2/25/20XX 14:30 |
| P001 (TRANSFER SCAN FILE) | U001 (USER A) | TRANSPORTATION COST | RECEIPT OF FUJI HOTEL | · · | 2/10/20XX 10:30 |

FIG. 8

| PLUG-IN ID | APPARATUS ID | USER ID | | |
|---|---|---|---|---|
| P001 (TRANSFER SCAN FILE) | E01 (A) | U001 (USER A) | U002 (USER B) | ... |
| | E02 (B) | U002 (USER B) | U003 (USER C) | ... |
| | E03 (C) | U001 (USER A) | U004 (USER D) | ... |
| P002 (CLOUD PRINT) | E01 (A) | U001 (USER A) | U003 (USER C) | ... |
| | E02 (B) | U002 (USER B) | U003 (USER C) | ... |
| | E03 (C) | U003 (USER C) | U004 (USER D) | ... |

FIG. 9

SETTING INFORMATION DATA

| PLUG-IN ID |
|---|
| USER ID |
| DATE AND TIME OF LAST UPDATE |
| PLUG-IN VERSION |
| SETTING INFORMATION |
|   INPUT INFORMATION |
|   SELECTION FREQUENCY INFORMATION |
|   LAST SELECTION INFORMATION |
|   REGISTERED INFORMATION |

FIG. 10A

| PLUG-IN ID | USER ID | SETTING INFORMATION | | ‥ | TIME STAMP |
| --- | --- | --- | --- | --- | --- |
| | | FILE NAME | READING RESOLUTION | | |
| P001 (α) | U001 (A) | File04.jpg | 200 dpi | ‥ | t31 |
| | U001 (A) | Image02.jpg | 400 dpi | ‥ | t32 |
| | U001 (A) | File03.bmp | 400 dpi | ‥ | t33 |
| | U001 (A) | Image01.jpg | 1200 dpi | ‥ | t34 |
| | U001 (A) | File02.jpg | 200 dpi | ‥ | t35 |
| | U001 (A) | File04.jpg | 400 dpi | ‥ | t36 |

FIG. 10B

| FILE NAME | fi |
| --- | --- |
| | File04.jpg<br>File03.bmp<br>File02.jpg<br>File04.jpg |

D2 → READING RESOLUTION
200 dpi ▽

FIG. 10D

D2 → READING RESOLUTION
200 dpi ▽
400 dpi
200 dpi
1200 dpi

INFORMATION PROCESSING SYSTEM FOR UPDATING FUNCTION SETTINGS IN A FIRST PRINTER WITH FUNCTION SETTING DATA RECEIVED FROM A SECOND PRINTER

CROSS-REFERENCE TO RELATED APPLICATIONS

This application is based on and claims priority under 35 USC 119 from Japanese Patent Application No. 2015-096474 filed May 11, 2015.

BACKGROUND (i) Technical Field

The present invention relates to an information processing system, an information processing apparatus, and a non-transitory computer readable medium.

(ii) Related Art

There is a technique that allows individual users to make a desired setting when the users use a function installed in an information processing apparatus, such as a multifunction peripheral. In this technique, in a case where there are plural apparatuses having a common function, pieces of setting information for individual users stored in the individual apparatuses are used. With regard to this, a configuration without a server for managing setting information is demanded in view of the maintenance and management of a server.

SUMMARY

According to an aspect of the invention, there is provided an information processing system including a first information processing apparatus and a second information processing apparatus that use setting information. The setting information is information that is stored for each user and that designates a condition for executing a function. The first information processing apparatus includes a transmission unit that transmits information including at least function identification information and user identification information to the second information processing apparatus, the function identification information identifying a function for which first setting information, which is the setting information stored in the first information processing apparatus, is used, and the user identification information identifying a user associated with the function identification information. The second information processing apparatus includes a request unit that makes a request for the first setting information to the first information processing apparatus in a case where second setting information is stored in the second information processing apparatus, the second setting information corresponding to the user identification information and being setting information for a function that is identified by function identification information; and an update unit that updates the second setting information in accordance with the first setting information that has been transmitted from the first information processing apparatus in response to the request made by the request unit.

BRIEF DESCRIPTION OF THE DRAWINGS

An exemplary embodiment of the present invention will be described in detail based on the following figures, wherein:

FIGS. 6A and 6B are diagrams illustrating examples of a UI screen that is displayed;

FIGS. 7A to 7D are diagrams illustrating examples of information stored in a memory;

FIG. 8 is a diagram illustrating an example of a license management table;

FIG. 9 is a diagram illustrating an example of setting information that is transmitted;

FIGS. 10A to 10D are diagrams illustrating an example of a determined display target and display order;

DETAILED DESCRIPTION

1. Exemplary Embodiment

Figure 1:
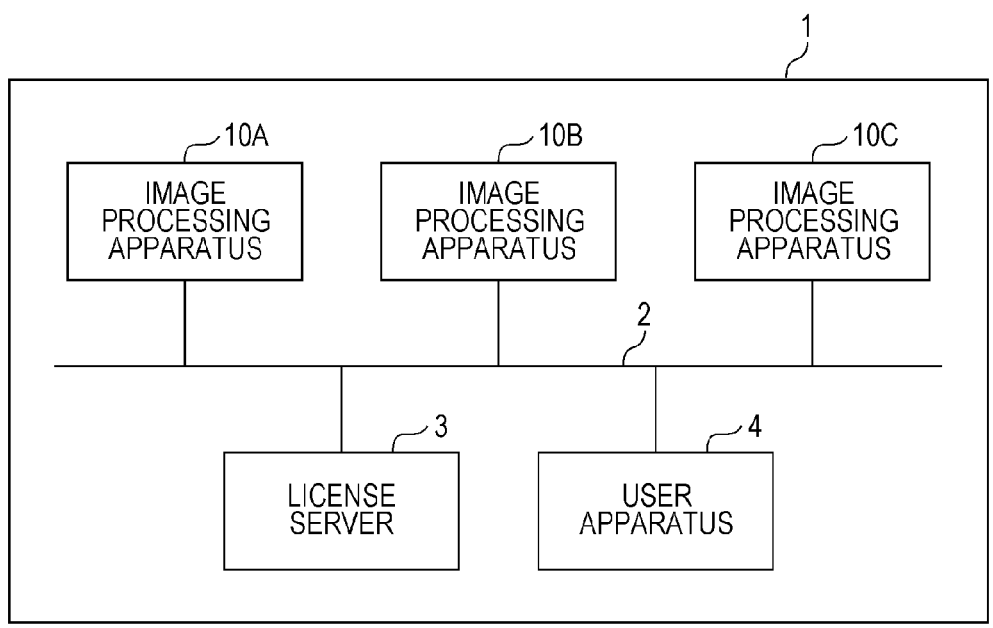
FIG. 1 is a diagram illustrating the overall configuration of an image processing system.

FIG. 1 illustrates the overall configuration of an image processing system 1 according to an exemplary embodiment of the present invention. The image processing system 1 provides users with various functions related to image formation on a recording medium such as a sheet and image reading from a recording medium, for example, a copy function, a facsimile (FAX) function, and a print function, and a function provided by an additional application. The image processing system 1 includes a communication line 2, image processing apparatuses 10A, 10B, and 10C (referred to as "image processing apparatuses 10" when not distinguished from one another), a license server 3, and a user apparatus 4. The communication line 2 is a system that mediates data communication between apparatuses connected to the communication line 2, and is, for example, a local area network (LAN) or a wide area network (WAN).

Each of the image processing apparatuses 10 is an example of an information processing apparatus, includes a unit that forms an image on a recording medium, and provides a user with the above-described various functions. The image processing apparatus 10 stores programs for implementing these functions. The programs include a program that is installed in advance before shipment, such as firmware, and an additional application that is installed after shipment. The firmware includes, for example, a general-purpose operating system (OS) and a controller (a program for controlling a target). The additional application is software such as a program that is additionally installed after shipment of the information processing apparatus. Examples of the additional application include a so-called plug-in and add-on. With an additional application, a function related to image processing, such as a function of performing recognition or optical character recognition (OCR) on a specific form or a function of transferring a document scanned by an image processing apparatus to a server over a cloud network, may be added or extended, and other functions may be added or extended. The plug-in according to the exemplary embodiment is an example of the above-described additional application.

A license to use a plug-in is granted when a licenser (the company that has developed the plug-in) issues the license. The license server 3 is an apparatus that determines whether or not a license is granted for a plug-in installed in an image processing apparatus 10, that is, an apparatus that manages a license. The user apparatus 4 is an apparatus used by a user, for example, a personal computer, a tablet terminal, a smartphone, or the like. The user apparatus 4 is used as a user interface (UI) for remotely operating an image processing apparatus 10.

Figure 2:
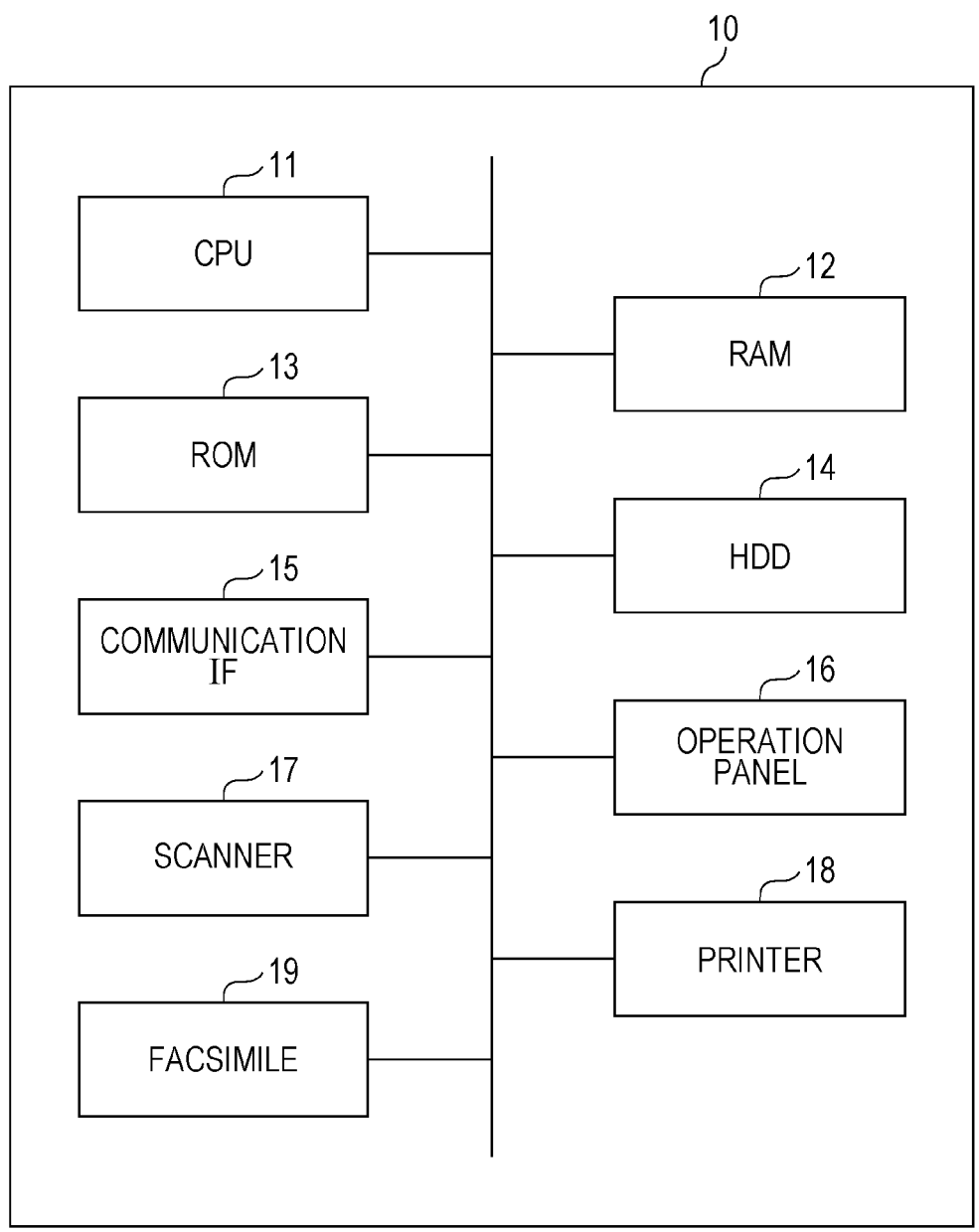
FIG. 2 is a diagram illustrating the hardware configuration of an image processing apparatus.

FIG. 2 illustrates the hardware configuration of the image processing apparatus 10. The image processing apparatus 10 is a computer that includes a central processing unit (CPU) 11, a random access memory (RAM) 12, a read only memory (ROM) 13, a hard disk drive (HDD) 14, a communication interface (IF) 15, an operation panel 16, a scanner 17, a printer 18, and a facsimile 19. The CPU 11 executes programs stored in the ROM 13 and the HDD 14, and controls the operations of the individual devices by using the RAM 12 as a working area. The HDD 14 stores various programs and data. The communication IF 15 functions as an interface for data communication that is performed through the communication line 2.

The operation panel 16 includes a display that displays various messages and images and an operator for operating the image processing apparatus 10 (including a touch screen provided on the display). The scanner 17 reads an image formed on a recording medium, such as a sheet. For example, the scanner 17 optically reads an image on a recording medium. The printer 18 forms an image on a recording medium. Specifically, the printer 18 forms an image on a recording medium by using toners of four colors including yellow (Y), magenta (M), cyan (C), and black (K) and an electrophotographic system. The facsimile 19 includes a FAX modem or the like and performs facsimile communication in accordance with a facsimile protocol.

Figure 3:
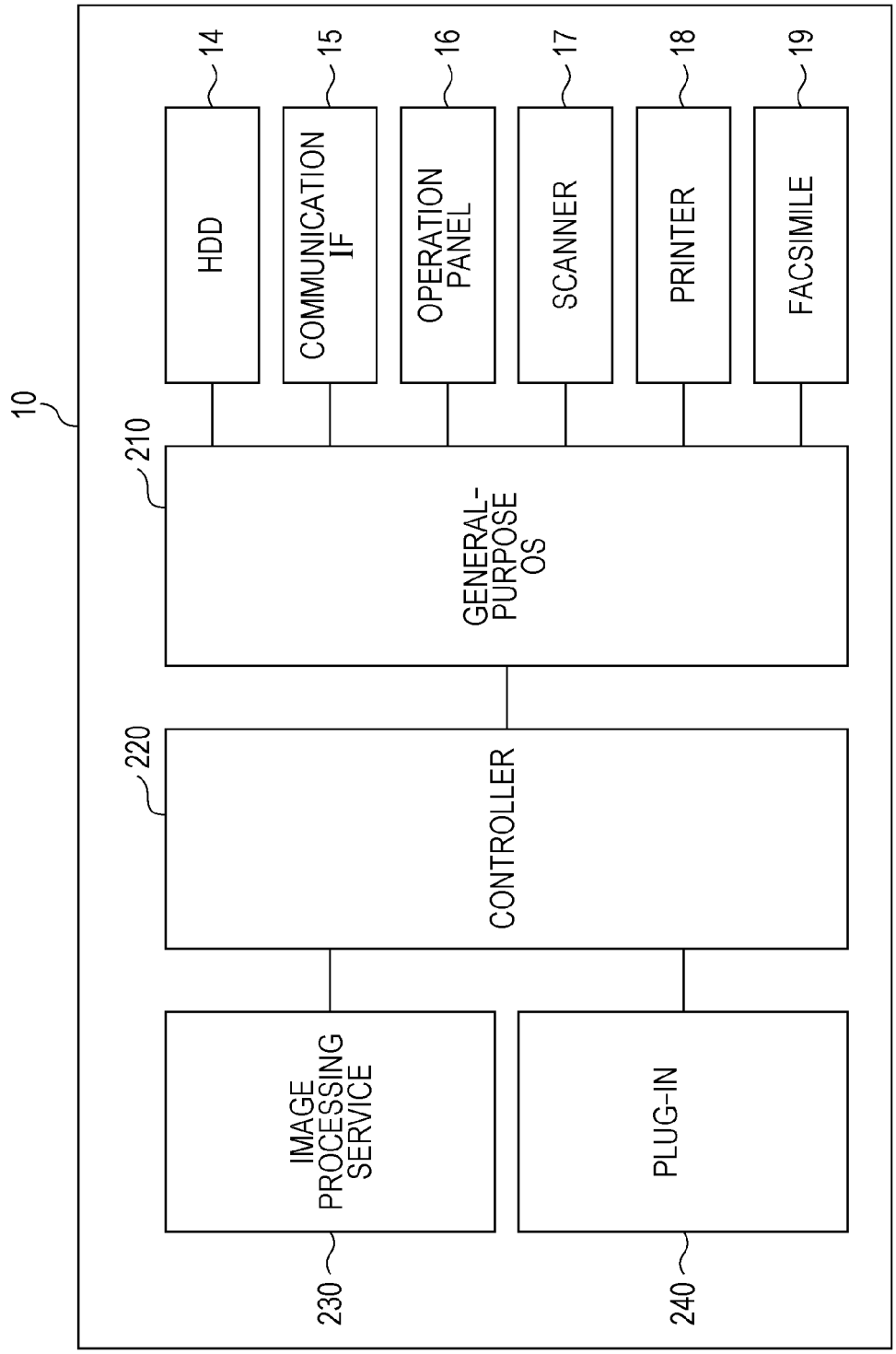
FIG. 3 is a diagram illustrating an overview of the software configuration of the image processing apparatus.

FIG. 3 illustrates an overview of the software configuration of the image processing apparatus 10. The image processing apparatus 10 includes a general-purpose OS 210, a controller 220, an image processing service 230, and a plug-in 240. The general-purpose OS 210 is an operating system in the image processing apparatus 10 and controls hardware devices such as the HDD 14, the communication IF 15, and the operation panel 16. The controller 220 controls the image processing service 230 and the plug-in 240. The image processing service 230 provides services involving image processing, such as a scan service and a print service. The plug-in 240 is the above-described additional application and adds or extends a function related to image processing.

Figure 4:
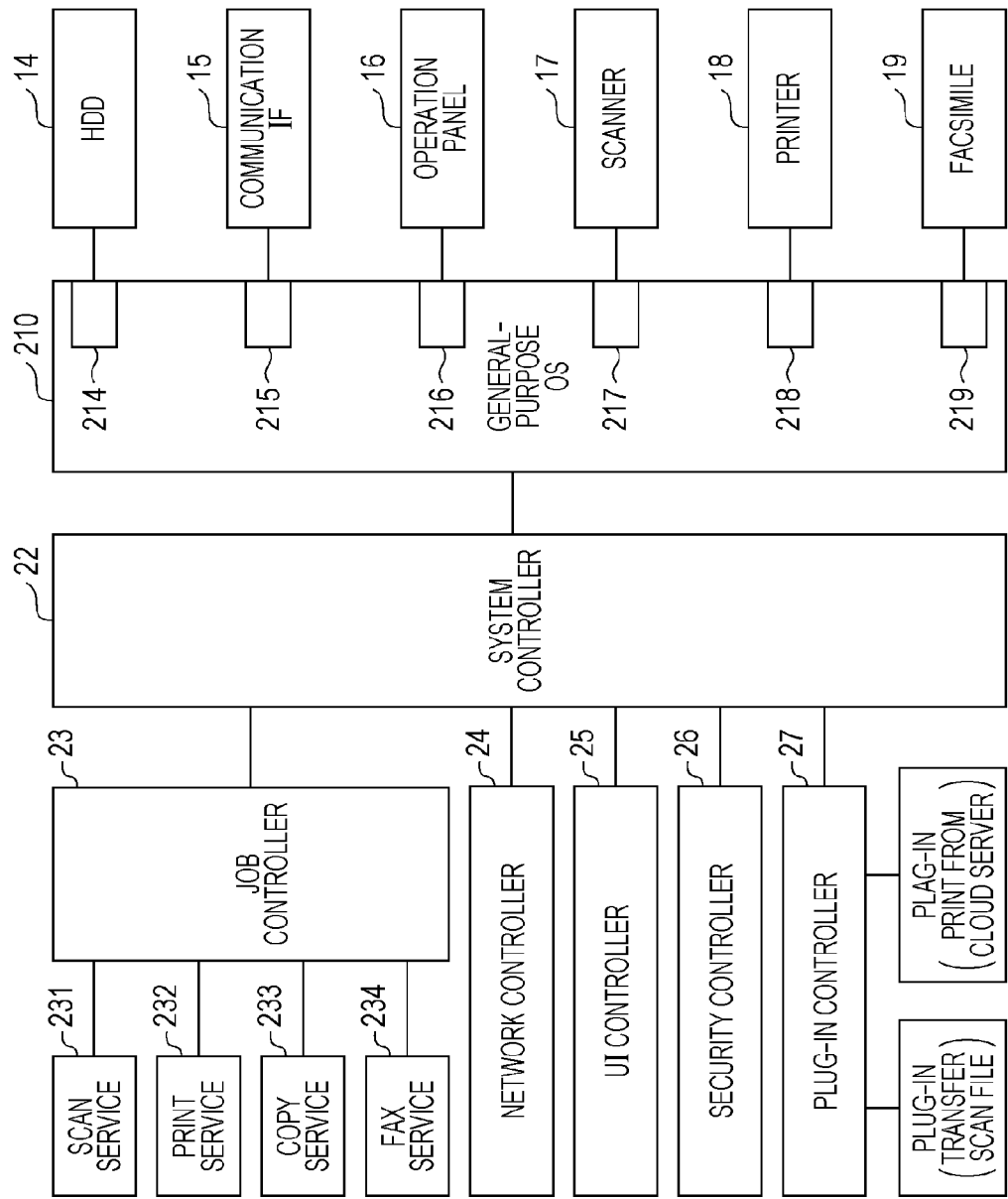
FIG. 4 is a diagram illustrating the details of the software configuration of the image processing apparatus.

FIG. 4 illustrates the details of the software configuration of the image processing apparatus 10. In the general-purpose OS 210, drivers 214, 215, 216, 217, 218, and 219 that respectively correspond to hardware devices including the HDD 14, the communication IF 15, the operation panel 16, the scanner 17, the printer 18, and the facsimile 19 are installed. These individual hardware devices are connected by the corresponding drivers.

A system controller 22 operates on the general-purpose OS 210 and controls various tasks including various controllers such as a job controller 23 and various services such as a scan service 231. The job controller 23 controls jobs of the scan service 231, a print service 232, a copy service 233, and a fax service 234 requested from a network controller 24 and a UI controller 25. The network controller 24 controls acceptance of a job request from the communication IF 15, reception of job data, reception of a plug-in, and transmission/reception of setting information.

The UI controller 25 controls display of a UI screen on the operation panel 16 or the user apparatus 4 and acceptance of a user operation including input using a key. The UI screen is a screen that displays an image representing an operator used by a user to operate the image processing apparatus 10, an image representing information provided by the image processing apparatus 10 to the user, and so forth. A security controller 26 controls functions related to authentication and encryption of communication.

A plug-in controller 27 adds and deletes a plug-in, controls execution of a plug-in, controls setting information, and manages a license. Here, the setting information is information that designates a condition for executing processing when a function of an information processing apparatus is executed, for example, information that designates a condition for executing a function of a plug-in (additional application) used in the image processing apparatus 10. In the exemplary embodiment, setting information is stored for each user. For example, in a case where the scan service 231 is used, the path of a storage area, a file name, the format of an output file, and so forth are stored as setting information. In the exemplary embodiment, the plug-in controller 27 performs the above-described processing for a plug-in (transfer a scan file) and a plug-in (print from a cloud server).

Figure 5:
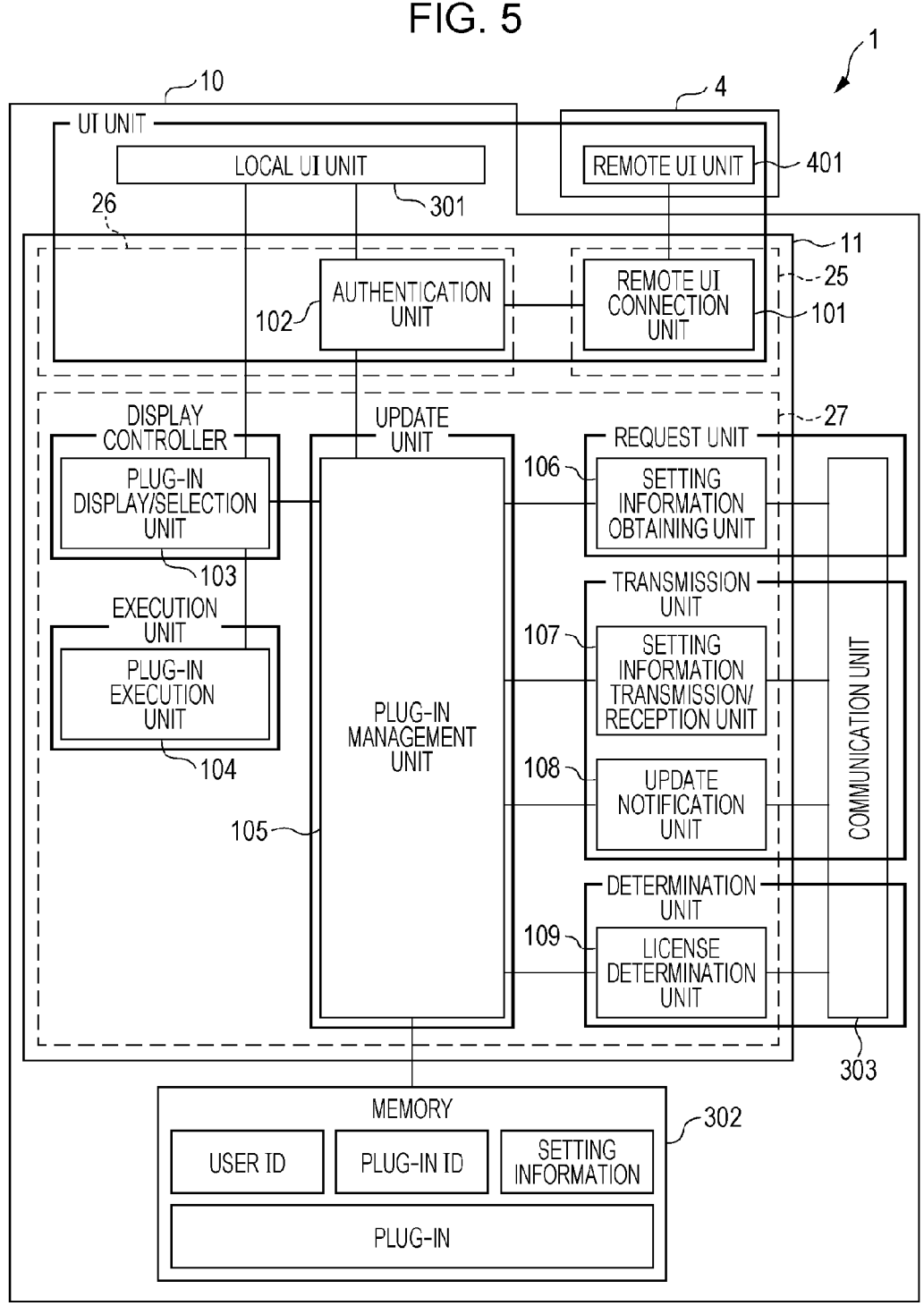
FIG. 5 is a diagram illustrating the detailed configuration of modules of the image processing system.

FIG. 5 illustrates the detailed configuration of modules of the image processing system 1. The modules are software elements for implementing the individual functions of the image processing system 1. The user apparatus 4 includes a remote UI unit 401. The image processing apparatus 10 includes a remote UI connection unit 101, an authentication unit 102, a plug-in display/selection unit 103, a plug-in execution unit 104, a plug-in management unit 105, a setting information obtaining unit 106, a setting information transmission/reception unit 107, an update notification unit 108, a license determination unit 109, a local UI unit 301, a memory 302, and a communication unit 303.

Each of the local UI unit 301 and the remote UI unit 401 displays a UI screen and accepts a user operation. The local UI unit 301 is implemented by the operation panel 16 in the exemplary embodiment and is used by a user who is at an installation place of the image processing apparatus 10 (a local place). The remote UI unit 401 is implemented by the user apparatus 4 in the exemplary embodiment and is used by a user who is at a place distant from the image processing apparatus 10 (a remote place). The remote UI connection unit 101 is a module included in the UI controller 25 and is connected to the remote UI unit 401 through the communication line 2. The remote UI connection unit 101 causes the remote UI unit 401 connected thereto to display a UI screen, and receives operation data representing a user operation accepted by the remote UI unit 401 and supplies the operation data to the image processing apparatus 10.

The authentication unit 102 is a module included in the security controller 26. For example, the authentication unit 102 performs user authentication on the basis of a user ID and a password that have been input from the local UI unit 301 or the remote UI unit 401 operated by a user. In the exemplary embodiment, the authentication unit 102 performs user authentication by communicating with an external authentication server. The authentication unit 102 causes the memory 302 to store a user ID of a user for which user authentication is performed for the first time as user identification information for identifying the user. The local UI unit 301, the remote UI unit 401, the remote UI connection unit 101, and the authentication unit 102 may be constituted by a UI unit as a single module.

The memory 302 stores the above-described setting information (information that is set for each user in relation to a function used in the image processing apparatus 10), function identification information for identifying the function to which the setting information is related, and a plug-in which is a function program thereof, as well as the user identification information stored by the authentication unit 102.

The plug-in display/selection unit 103 causes the local UI unit 301 or the remote UI unit 401 to display a UI screen that is used to operate a function implemented by each plug-in, and accepts a selection operation performed by a user on the basis of the UI screen. The plug-in display/selection unit 103 is an example of a display controller according to an exemplary embodiment of the present invention. The plug-in execution unit 104 executes a plug-in on the basis of a user selection performed in accordance with an operation accepted by the plug-in display/selection unit 103. The plug-in execution unit 104 executes the plug-in in this manner and thereby executes the function implemented by the plug-in. The plug-in execution unit 104 is an example of an execution unit according to an exemplary embodiment of the present invention.

The plug-in management unit 105 manages setting information stored in the memory 302 and a license state of a plug-in that has been installed in the image processing apparatus 10. The plug-in management unit 105 may manage setting information, or each plug-in stored in the memory 302 may hold its setting information. In a case where the plug-in management unit 105 manages setting information, the plug-in management unit 105 stores, in the memory 302, the setting information and a user ID of the user for which the setting information is set in association with each other. On the other hand, in a case where each plug-in holds its setting information, the plug-in management unit 105 instructs the plug-in execution unit 104 to update the setting information, and each plug-in updates the setting information in response to the instruction. The plug-in management unit 105 is an example of an update unit according to an exemplary embodiment of the present invention.

In the exemplary embodiment, a license of a plug-in is granted for each user and each image processing apparatus. Thus, for example, user A has a license of a plug-in (transfer a scan file) in the image processing apparatus 10A, but does not have a license of a plug-in (transfer a scan file) in the image processing apparatus 10B. The plug-in management unit 105 causes the memory 302 to store a plug-in ID assigned to a plug-in and a user ID of a user having a license of the plug-in in association with each other, and thereby manages a license state.

The setting information obtaining unit 106 obtains setting information from another image processing apparatus 10 via the communication unit 303. The setting information obtaining unit 106 and the communication unit 303 may be constituted by a request unit as a single module. Upon receiving a request for setting information from another image processing apparatus 10 via the communication unit 303, the setting information transmission/reception unit 107 transmits the setting information to the request source via the communication unit 303. The update notification unit 108 notifies, via the communication unit 303, another image processing apparatus 10 that the setting information stored in the image processing apparatus 10 has been updated. The setting information transmission/reception unit 107, the update notification unit 108, and the communication unit 303 may be constituted by a transmission unit as a single module. The license determination unit 109 determines a plug-in that is licensed to a user by making an inquiry of the license server 3 via the communication unit 303. The license determination unit 109 and the communication unit 303 may be constituted by a determination unit as a single module.

Each of the local UI unit 301 and the remote UI unit 401 displays a UI screen and accepts a user operation. In the exemplary embodiment, the image processing apparatus 10 is used by a user who has logged therein by inputting a user ID and a password. The login may be performed for each function, not for each apparatus. In this case, each function is used by a user who has logged in by inputting a user ID and a password on the corresponding login screen. The authentication unit 102 authenticates the user in the login. After the user has been authenticated, one of the local UI unit 301 and the remote UI unit 401 that is operated by the user (hereinafter referred to as a "UI unit in operation") displays a UI screen and accepts a user operation.

FIGS. 6A and 6B illustrate examples of a UI screen that is displayed. FIG. 6A illustrates a UI screen B1 that is displayed when a scan function is provided. On the UI screen B1, operator images C1, C2, C3, and C4 and selection candidate images D1, D2, and D3 are displayed. When the operator image C1 including a character string "return" is operated, the UI unit in operation displays the preceding screen. When the operator image C2 including a character string "close" is operated, the UI unit in operation displays, for example, a menu screen. When the operator image C3 including a character string "logout", the UI unit in operation displays a post-logout screen.

The UI unit in operation displays the selection candidate images D1, D2, and D3 as candidates of setting information to be used in the scan function. The selection candidate image D1 represents a path name of a predetermined storage area (in FIG. 6A, "Fuji Taro's drawer>Product assigned>ApeosWare"), an image indicating that a file name is "automatically set", and a display field D11 for displaying a file name (in FIG. 6A, "purchase of management software.pdf"). In a case where a file name is automatically set, the UI unit in operation automatically generates a file name different from file names stored in the storage area and displays the generated file name in the display field D11. The storage area and the file name are displayed as a candidate of setting information. The user may cancel the automatic setting and may manually input a file name into the display field D11. In this case, the input file name is displayed as a candidate of setting information.

The selection candidate image D2 represents, as candidates of setting information, the format of an output file "pdf", a color mode "full color", and so forth. Upon a pulldown button D21 being operated, the UI unit in operation displays a list of candidates of setting information. Upon any of the candidates being selected from the list by the user, the UI unit in operation displays the selection candidate image D2 including the selected candidate. For example, if the user selects "gif" from the list of candidates of the format of an output file, "gif" is displayed on the UI screen B1 as a candidate of setting information, instead of "pdf".

The selection candidate image D3 represents candidates of setting information indicating whether or not each of the functions "remove ground color", "prevent show-through", and "press with high pressure" is to be used. When a check box D31 corresponding to each function is checked, it indicates that the function is to be used. When the check box D31 is not checked, it indicates that the function is not to be used. In the example illustrated in FIG. 6A, it is indicated, as candidates of setting information, that the function "remove ground color" is to be used and the two other functions are not to be used. Upon the operator image C4 including a character sting "start scan" being operated, the UI unit in operation notifies the plug-in execution unit 104 of the candidate of setting information selected at the time and that an instruction to perform scan processing using the setting information has been provided.

FIG. 6B illustrates a UI screen B2 that is displayed when the FAX function is provided. The UI screen B2 includes an operator image C5 and a selection candidate image D4. The selection candidate image D4 represents, as candidates of setting information, a user's email address registered in advance by the user and a FAX number of a business acquaintance. When a check box D41 corresponding to each candidate is checked, it indicates that FAX processing using the address is to be performed. When the check box D41 is not checked, it indicates that FAX processing using the address is not to be performed. Upon the operator image C5 including a character string "start FAX" being operated, the UI unit in operation notifies the plug-in execution unit 104 of the address selected at the time (a candidate of setting information in this example) and that an instruction to perform FAX processing using the address has been provided.

The plug-in execution unit 104 executes a plug-in and thereby executes the function implemented by the plug-in and performs processing related to the function. In the processing related to the function, the setting information related to the function is used. The plug-in execution unit 104 performs processing by using a candidate selected by the user from among the candidates of setting information displayed by the UI unit in operation. For example, upon the operator image C4 being selected in the state illustrated in FIG. 6A, the plug-in execution unit 104 performs reading processing of reading an image from a recording medium by using the setting information indicating that the format of an output file is pdf, the color mode is full color, the document orientation is the left, the reading size is A4 landscape, the reading resolution is 200 dpi, double-sided document feed is double sided (vertical binding), and the ground color is removed. The read image is stored in the storage area represented by the path name "Fuji Taro's drawer>Product assigned>ApeosWare" with the file name "purchase of management software.pdf".

A candidate of setting information is no longer a candidate of setting information after being used in processing by the plug-in execution unit 104, and becomes setting information used in the processing. After performing the processing in the above-described manner, the plug-in execution unit 104 supplies, to the memory 302, the setting information used in the processing together with the plug-in ID assigned to the plug-in that implements the related function, the user ID input by the user to log in, and a time stamp representing a current time, and stores them in association with one another.

The time stamp is time information representing the time at which setting information is used. The plug-in ID identifies a plug-in and also identifies the function implemented by the plug-in. That is, the plug-in ID is an example of the above-described function identification information. The user ID is an example of user identification information identifying a user. The memory 302 stores the plug-in ID as function identification information and the user ID as user identification information.

The memory 302 stores the setting information, plug-in ID, user ID, and time stamp supplied from the plug-in execution unit 104 in association with one another. The memory 302 also stores the plug-in corresponding to the stored plug-in ID, that is, the plug-in executed by the plug-in execution unit 104. The memory 302 is implemented by, for example, the HDD 14.

FIGS. 7A to 7D illustrate examples of information stored in the memory 302. In FIG. 7A, for example, a user ID "U001" of user A, setting information including a folder name in a storage area "approval document" and a file name "purchase of management software", and a time stamp "3/1/20xx 15:00" are associated with a plug-in ID "P001", which is a plug-in ID of a plug-in that implements the function of transferring a scan file. Also, "U001", "approval document", "conclusion of maintenance contract", and "2/25/20xx 14:30", and "U001", "transportation cost", "receipt of Fuji Hotel", and "2/10/20xx 10:30" are associated with the plug-in ID "P001". In this way, the memory 302 stores a history of setting information used in the function implemented by the plug-in (transfer a scan file). In this example, individual pieces of setting information are stored for different time stamps even if the user ID is the same. Alternatively, setting information corresponding to an old time stamp may be overwritten with setting information corresponding to a new time stamp. In this case, only the latest setting information is stored as a history of setting information.

FIG. 7B illustrates an example of user IDs, setting information, and time stamps that are stored in association with a plug-in ID "P002" of a plug-in that implements the function of print from a cloud server. In this example, information representing "color mode", "number of copies (total)", and so forth is associated as setting information. In this way, the stored setting information varies according to a used function. Each function is implemented by a plug-in identified by a plug-in ID. Thus, the plug-in ID is also used as function identification information identifying a function implemented by an additional application. Thus, the memory 302 stores function identification information identifying a function (in the example illustrated in FIGS. 7A to 7D, a plug-in ID), user identification information identifying a user who uses the function (in the example illustrated in FIGS. 7A to 7D, a user ID), setting information for the function set for the user, and time information representing the time at which the setting is made (in the example illustrated in FIGS. 7A to 7D, a time stamp) in association with one another.

The setting information transmission/reception unit 107, the update notification unit 108, and the communication unit 303 transmit, to another image processing apparatus 10, information including at least function identification information identifying a function related to setting information stored in the memory 302 and user identification information identifying a user for which the setting information is set. For example, when a user finishes using a function of an image processing apparatus 10, the setting information related to the function is stored in the memory 302 of the apparatus as described above, and thus the update notification unit 108 of the apparatus transmits function identification information identifying the function and user identification information identifying the user to another image processing apparatus 10.

In the exemplary embodiment, the update notification unit 108 multicasts a plug-in ID and a user ID associated with each other as function identification information and user identification information in the memory 302 to another image processing apparatus 10 in the same sub-network. For example, in a case where the apparatuses connected to the communication line 2 illustrated in FIG. 1 are in the same sub-network, the update notification unit 108 of the image processing apparatus 10A transmits the plug-in ID and user ID to the image processing apparatuses 10B and 10C, and the update notification unit 108 of the image processing apparatus 10B transmits the plug-in ID and user ID to the image processing apparatuses 10A and 10C.

When a screen for using a function is switched to another screen, the update notification unit 108 determines that the user has finished using the function. Specifically, when the user operates the operator image C2 on the UI screen B1 illustrated in FIG. 6A to switch the screen to the menu screen or when the user operates the operator image C3 to switch the screen to a post-logout screen, the update notification unit 108 determines that the user has finished using the scan function. After making the determination, the update notification unit 108 refers to the memory 302 and transmits the user ID used for login and the plug-in ID associated therewith to another image processing apparatus 10.

The update notification unit 108 transmits the above-described information after the user has finished using the function of the image processing apparatus 10 and the setting information used for the function has been stored in the memory 302. Therefore, by transmitting the function identification information and user identification information, the update notification unit 108 notifies another image processing apparatus 10 that the setting information for the function identified by the function identification information, that is, the setting information set for the user identified by the user identification information, has been updated. After that, the setting information transmission/reception unit 107 transmits the setting information. Before describing this, the license determination unit 109 and the setting information obtaining unit 106 will be described.

The license determination unit 109 makes an inquiry of the license server 3 about whether or not a user is licensed to use a program. For example, when a user logs in an image processing apparatus 10, the license determination unit 109 of the apparatus determines whether or not the user is licensed to use a plug-in stored in the apparatus. Also, when receiving a notification about update of setting information from another image processing apparatus 10, the license determination unit 109 determines the plug-in corresponding to the setting information and whether or not the user is licensed to use the plug-in in the apparatus. The license determination unit 109 transmits the function identification information (plug-in ID) and user identification information (user ID) of a program for which whether a license has been granted is to be determined, to the license server 3 via the communication unit 303 together with apparatus identification information identifying the image processing apparatus 10. As the apparatus identification information, an apparatus ID assigned to the image processing apparatus 10 may be used.

In the exemplary embodiment, a license of a plug-in is granted for each combination of a user and an image processing apparatus. Thus, for example, user A has a license of a plug-in (transfer a scan file) in the image processing apparatus 10A but does not have a license of a plug-in (transfer a scan file) in the image processing apparatus 10B. The license server 3 stores a license management table in which plug-in IDs, apparatus IDs, and user IDs are associated with one another.

FIG. 8 illustrates an example of the license management table. In the example illustrated in FIG. 8, apparatus IDs "E01", "E02", and "E03" of the image processing apparatuses 10A, 10B, and 10C, and user IDs of users who are licensed to use the corresponding plug-ins in the individual apparatuses are associated with the plug-in ID "P001" of the plug-in (transfer a scan file) and the plug-in ID "P002" of the plug-in (print from the cloud server) illustrated in FIG. 4. For example, the user ID "U001" of user A is associated with a combination of "P001" and "E01" and a combination of "P002" and "E01". Thus, user A is licensed to use both the plug-in (transfer a scan file) and the plug-in (print from the cloud server) in the image processing apparatus 10A. On the other hand, the user ID "U001" is not associated with a combination of "P001" and "E02" and a combination of "P002" and "E02". Thus, user A is not licensed to use the plug-in (transfer a scan file) and the plug-in (print from the cloud server) in the image processing apparatus 10B.

When the license server 3 receives a plug-in ID, an apparatus ID, and a user ID from an image processing apparatus 10, the license server 3 notifies the transmission source that a license to use the plug-in has been granted if these IDs are associated with one another in the license management table, and notifies the transmission source that a license to use the plug-in has not been granted if these IDs are not associated with one another. On the basis of this notification, the license determination unit 109 determines whether or not the license has been granted. For example, when a user logs in an image processing apparatus 10, the license determination unit 109 of the apparatus determines whether or not the user is licensed to use a plug-in installed in the apparatus. If the license determination unit 109 determines that a license has been granted in the case of receiving a notification about update of setting information from another apparatus, the license determination unit 109 notifies the setting information obtaining unit 106 of that fact.

In a case where the license determination unit 109 of an image processing apparatus 10 determines that a user is licensed to use, in the apparatus, a program for implementing a function identified by function identification information obtained from another image processing apparatus 10, the setting information obtaining unit 106 makes the following request to the other image processing apparatus 10 via the communication unit 303. In a case where the program that has been determined to be licensed and setting information related to the function implemented by the program are stored in the memory 302 of the apparatus, the setting information obtaining unit 106 requests the apparatus as a transmission source (the other apparatus) for the setting information corresponding to the function identification information and user identification information obtained when the determination is made.

The setting information corresponding to the identification information (function identification information and user identification information) transmitted from the other apparatus is setting information for the function identified by the function identification information and setting information set for the user identified by the user identification information. Hereinafter, the image processing apparatus 10 as a transmission source of the identification information (another apparatus) is referred to as a "first information processing apparatus", the memory 302 of the apparatus is referred to as a "first memory", and the setting information stored in the first memory is referred to as "first setting information" if necessary. On the other hand, the image processing apparatus 10 that requests the first setting information is referred to as a "second information processing apparatus", the memory 302 of the apparatus is referred to as a "second memory", and the setting information stored in the second memory is referred to as "second setting information".

The setting information associated with a plug-in ID and a user ID in the memory 302 is referred to as setting information corresponding to these pieces of identification information (function identification information and user identification information). That is, when the setting information obtaining unit 106 receives a plug-in ID and a user ID from a first information processing apparatus, in a case where the plug-in identified by the plug-in ID and second setting information corresponding to the pieces of identification information are stored in the second memory, the setting information obtaining unit 106 requests the first information processing apparatus for the setting information corresponding to the pieces of identification information (first setting information in the first information processing apparatus).

For example, it is assumed that the image processing apparatus 10B receives a plug-in ID of a plug-in (transfer a scan file) and a user ID of user B from the image processing apparatus 10A. In this case, if the license table illustrated in FIG. 8 is stored in the license server 3, it is determined by the license determination unit 109 of the image processing apparatus 10B that user B is licensed to use the plug-in (transfer a scan file) in the image processing apparatus 10B. Then, the setting information obtaining unit 106 of the image processing apparatus 10B determines that the plug-in (transfer a scan file) and the setting information corresponding to the transmitted information (corresponding to second setting information) are stored if the plug-in ID of the plug-in (transfer a scan file) and the user ID of user B are stored in the memory 302 of the image processing apparatus 10B, and requests the image processing apparatus 10A as the transmission source for the setting information corresponding to the function identification information and user identification information transmitted from the first information processing apparatus (corresponding to first setting information).

After the setting information transmission/reception unit 107 has transmitted function identification information and user identification information to another image processing apparatus 10 in the above-described manner, when receiving a request for setting information corresponding to the function identification information and user identification information (corresponding to first setting information) from the other image processing apparatus 10 as the transmission destination, the setting information transmission/reception unit 107 transmits the setting information to the other image processing apparatus 10 as the request source via the communication unit 303. In the above-described example, the setting information transmission/reception unit 107 of the image processing apparatus 10A receives a request for setting information corresponding to the plug-in ID of the plug-in (transfer a scan file) and the user ID of user B from the setting information obtaining unit 106 of the image processing apparatus 10B, and thus the setting information transmission/reception unit 107 of the image processing apparatus 10A transmits the setting information to the image processing apparatus 10B.

FIG. 9 illustrates an example of setting information that is transmitted. The setting information transmission/reception unit 107 transmits setting information data including setting information via the communication unit 303, and thereby transmits the setting information. The header of the setting information data includes a plug-in ID, a user ID, the date and time of the last update, and a plug-in version. The date and time of the last update is the latest time stamp among time stamps associated with the setting information in the memory 302. That is, the date and time of the last update is the date and time when the setting information was last updated. The setting information includes input information, selection frequency information, last selection information, and registered information.

The input information is setting information represented by characters and numerals input by a user, such as a file name and a FAX number. The selection frequency information is information representing the frequency at which each candidate is selected in a case where any one of plural candidates of setting information is selected and used. The last selection information is information representing the last selected candidate. The registered information is information registered by a user as a candidate of setting information. The registered information may include, for example, a FAX number of a transmission destination and an email address.

When the plug-in management unit 105 of an image processing apparatus 10 receives setting information from the setting information transmission/reception unit 107 of another image processing apparatus 10 (setting information corresponding to the first setting information), the plug-in management unit 105 updates the setting information stored in the memory 302 of the apparatus (setting information corresponding to the second setting information) in accordance with the received setting information. The plug-in management unit 105 may overwrite the stored second setting information with the first setting information or may reflect the difference between the first setting information and the second setting information in the second setting information.

In the exemplary embodiment, the plug-in management unit 105 has a function of controlling write of setting information in the memory 302 and updates setting information by using the function. In this case, the setting information is updated regardless of the state of processing related to the function (the state of processing of the plug-in execution unit 104). The plug-in management unit 105 does not necessarily have this function. For example, the plug-in execution unit 104 may have this function. In this case, the plug-in management unit 105 updates the setting information by requesting the plug-in execution unit 104. After the plug-in management unit 105 updates the second setting information in accordance with the first setting information, the plug-in management unit 105 notifies the plug-in display/selection unit 103 of that fact. In this case, the load of writing in the memory 302 is not imposed on the plug-in management unit 105.

The plug-in display/selection unit 103 determines, on the basis of the setting information updated by the plug-in management unit 105 and stored in the second memory, when the function related to the setting information is used by a user for which the setting information is set, at least one of a display target among candidates of the setting information used in the function and an arrangement order in which the candidates are displayed. In the exemplary embodiment, the plug-in display/selection unit 103 determines both the display target and the arrangement order. The plug-in display/selection unit 103 displays the determined display target in the determined arrangement order on the UI unit in operation. Accordingly, candidates of the setting information are displayed in a display method corresponding to the setting information that has previously been used. A method for determining a display target and an arrangement order will be described below with reference to FIGS. 10A to 10D.

FIGS. 10A to 10D illustrate an example of a display target and a display order that have been determined. FIG. 10A illustrates an example of setting information that is stored after being updated. In this example, setting information (file names, reading resolutions, and so forth) and time stamps t31 to t36 (t31 represents the latest date and time and t36 represents the oldest date and time) associated with the plug-in ID of a plug-in (transfer a scan file) and the user ID of user A are illustrated. In the exemplary embodiment, it is assumed that the reading resolution is able to be set in 200 dpi steps from "200 dpi" to "1200 dpi", and those that have previously been used as setting information are illustrated in FIG. 10A.

The plug-in display/selection unit 103 determines, as display targets, candidates of a character string input by a user as a name related to setting information (in this example, a file name). The display targets determined in this manner are illustrated in FIG. 10B. In FIG. 10B, a user inputs characters "fi" in the display field D11 of "file name", and candidates of a character string starting from "fi", that is, "File04.jpg", "File03.bmp", "File02.jpg", and "File01.jpg" are displayed. These candidates of a character string are candidates of setting information and are display targets in this case. In this case, the plug-in display/selection unit 103 determines, as display targets, the file names starting from the characters input to the display field D11 by the user among the file names as input information in the example illustrated in FIG. 10A.

Also, the plug-in display/selection unit 103 determines the arrangement order of plural candidates of setting information that are displayed in accordance with a user operation. In the example illustrated in FIG. 10B, four candidates of a file name are displayed in accordance with a user operation of inputting characters "fi", and the candidates are displayed from the top to bottom such that "File04.jpg" is at the top and "File01.jpg" is at the bottom. In this case, the plug-in display/selection unit 103 determines the arrangement order of individual display targets so that the arrangement order corresponds to the chronological order of time stamps (in this example, "File04.jpg" is at the top because the time stamp t31 corresponding thereto is the latest and "File01.jpg" is at the bottom because the time stamp t36 corresponding thereto is the oldest). Accordingly, the candidates of setting information displayed in accordance with a user operation are displayed in an arrangement order that varies according to each user.

The plug-in display/selection unit 103 determines, as a display target, a candidate to be displayed before the user makes a selection from among candidates of setting information. A display target determined in this manner is illustrated in FIG. 10C. In FIG. 10C, "200 dpi" is displayed as a currently selected candidate of setting information of "reading resolution". In this case, the plug-in display/selection unit 103 determines the candidate of setting information having the latest time stamp, that is, the latest date and time of the last update (in this example, "200 dpi" corresponding to t31) as a display target to be displayed before the user makes a selection. If the determination of the display target is made on the selection candidate image D3 illustrated in FIG. 6A (the image indicating whether or not each function is to be used), for example, the selection candidate image D3 is displayed in a state where the check box D31 selected last by the user is checked. Accordingly, the candidate of setting information that is displayed first corresponds to the setting information that has previously been used.

Also, the plug-in display/selection unit 103 determines, as a display target, the setting information that has previously been set for the user. The display target determined in this manner is illustrated in FIG. 10D. In FIG. 10D, candidates of setting information "400 dpi", "200 dpi", and "1200 dpi" are displayed in a pulldown menu of the reading resolution. These candidates have previously been used as setting information of the reading resolution, and candidates that have not previously been used "600 dpi", "800 dpi", and "1000 dpi" are not displayed. Accordingly, the time and effort to select a candidate of setting information that has previously been used is reduced compared to a case where the display target is not determined in the above-described manner.

The pulldown menu illustrated in FIG. 10D is an example of a history of plural pieces of setting information that are displayed in accordance with a user operation. The plug-in display/selection unit 103 determines the arrangement order of the pieces of setting information. In this example, the plug-in display/selection unit 103 determines the arrangement order of the history of setting information in accordance with the frequency at which the setting information has previously been set on the basis of selection frequency information in the setting information. In the example illustrated in FIG. 10D, the selection frequency of "400 dpi", which has been selected three times, is the highest, and the selection frequency decreases in the order of "200 dpi", which has been selected twice, and "1200 dpi", which has been selected once. Thus, the plug-in display/selection unit 103 determines this order as an arrangement order.

Next, a description will be given of the operation procedure of the individual apparatuses to update setting information in the image processing system 1.

Figure 11:
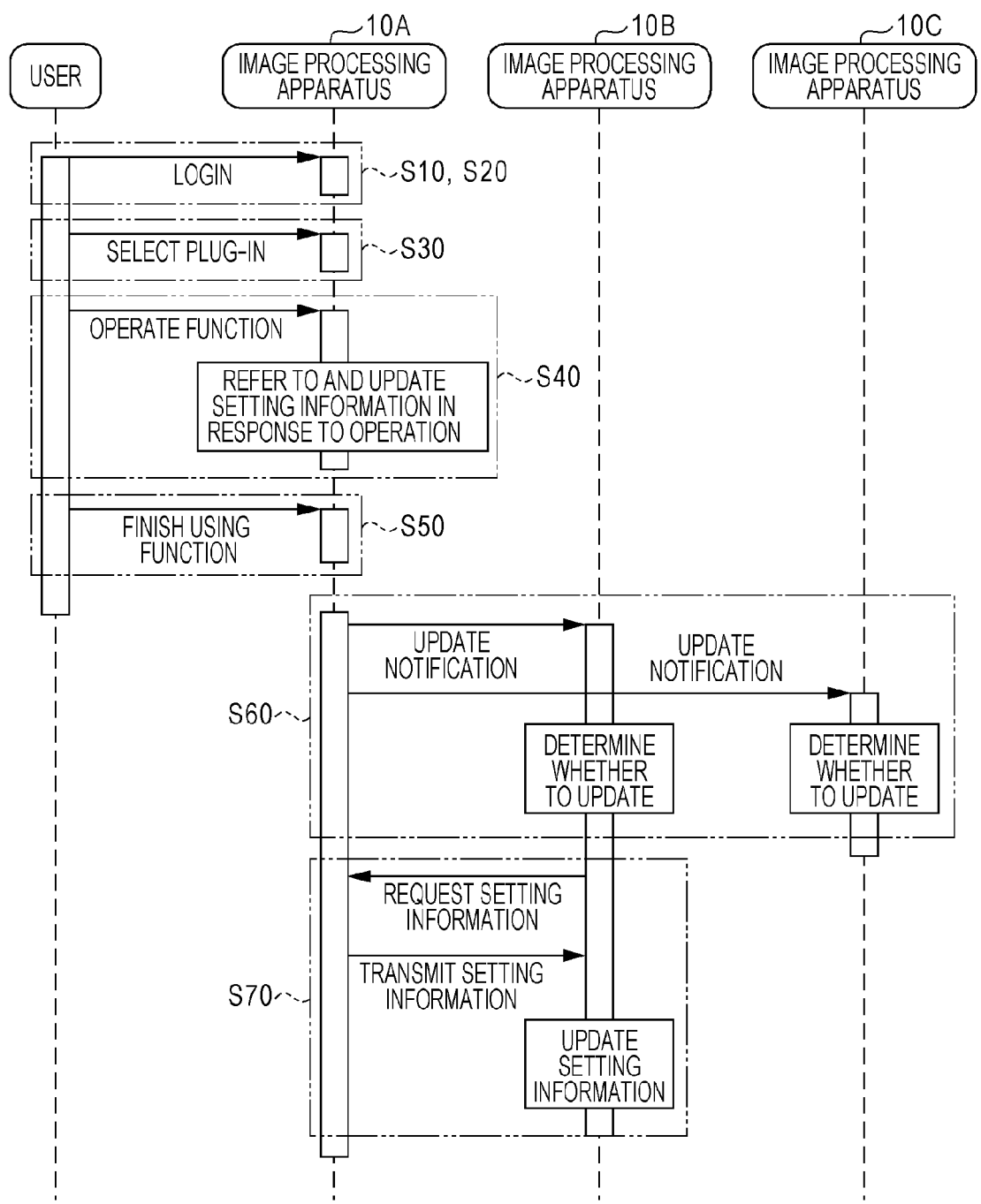
FIG. 11 is a diagram illustrating an example of an outline of an operation procedure to update setting information.

FIG. 11 illustrates an example of an outline of the operation procedure to update setting information. FIG. 11 illustrates a case where the image processing apparatus 10A among the image processing apparatuses 10A to 10C is operated by a user. In this example, the user logs in the image processing apparatus 10A, and then the image processing apparatus 10A performs authentication processing for login (step S10) and plug-in display processing for displaying available plug-ins (step S20).

Subsequently, when the user performs an operation of selecting a plug-in, the image processing apparatus 10A performs UI screen display processing (step S30) for displaying a UI screen (the UI screens B1 and B2 illustrated in FIGS. 6A and 6B are examples) on the basis of setting information. Subsequently, the user operates the UI screen to perform an operation for using a function implemented by the plug-in, and then the image processing apparatus 10A performs setting information-related processing (step S40) for referring to and updating the setting information stored in the image processing apparatus 10A in accordance with the user operation. For example, if the user provides an execution instruction after changing the file name to "purchase of management software" on the screen illustrated in FIG. 6A, changed setting information is stored in the memory 302. For example, in FIG. 7A, the information described in the first row is stored. After that, when the user performs an operation of finishing using the function, the image processing apparatus 10A performs notification processing (step S50) for notifying the other image processing apparatuses 10 that the setting information has been updated.

After the image processing apparatus 10A has transmitted an update notification to the image processing apparatuses 10B and 10C in the notification processing, the image processing apparatuses 10B and 10C perform determination processing (step S60) for determining whether or not the setting information for which the update notification has been provided is to be updated in the image processing apparatuses 10B and 10C. The determination processing will be described below with reference to FIG. 13. In this example, it is assumed that the image processing apparatus 10B determines to update the setting information, whereas the image processing apparatus 10C determines not to update the setting information. After determining to update the setting information, the image processing apparatus 10B requests the setting information to the image processing apparatus 10A, and the image processing apparatus 10A transmits the requested setting information. Accordingly, update processing (step S70) is performed in which the image processing apparatus 10B updates the setting information.

Figure 12:
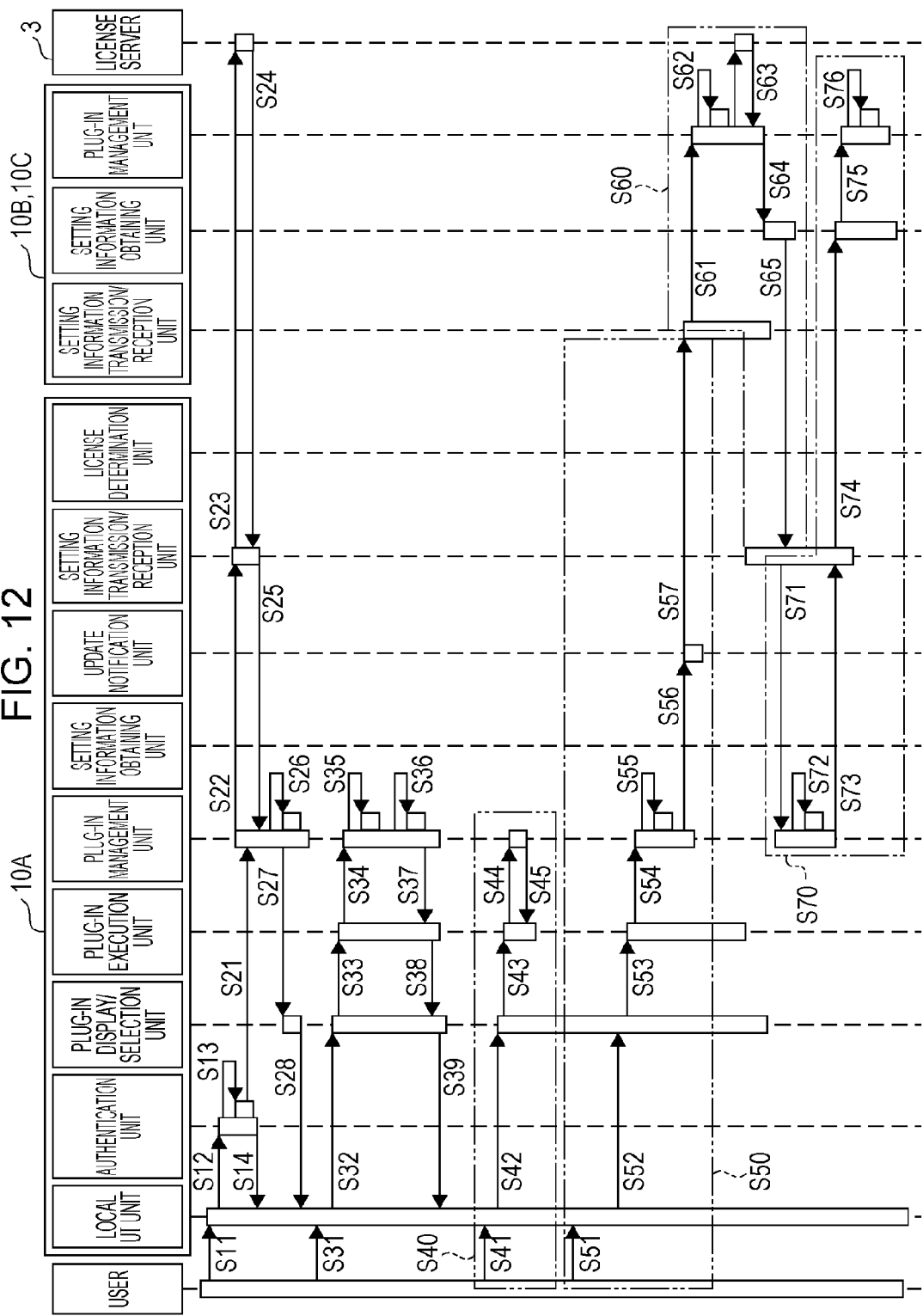
FIG. 12 is a diagram illustrating an example of the details of the operation procedure to update setting information.

FIG. 12 illustrates an example of the details of the operation procedure to update setting information. This operation procedure corresponds to the details of the operation procedure illustrated in FIG. 11. In this example, the local UI unit 301, the authentication unit 102, the plug-in display/selection unit 103, the plug-in execution unit 104, the plug-in management unit 105, the setting information obtaining unit 106, the update notification unit 108, the setting information transmission/reception unit 107, and the license determination unit 109 of the image processing apparatus 10A serve as an operation entity. Also, the setting information transmission/reception units 107, the setting information obtaining units 106, and the plug-in management units 105 of the image processing apparatuses 10B and 10C and the license server 3 illustrated in FIG. 1 serve as an operation entity. In the example illustrated in FIG. 12, the setting information in the image processing apparatuses 10B and 10C is updated. That is, the image processing apparatus 10A operates as a first information processing apparatus, and the image processing apparatuses 10B and 10C operate as second information processing apparatuses.

First, when a user performs, on the local UI unit 301 (for example, the operation panel), a login operation of inputting a user ID and a password (step S11), the above-described authentication processing (step S10) is started. The local UI unit 301 supplies the input user ID and password to the authentication unit 102 and requests user authentication (step S12). The authentication unit 102 performs authentication processing on the basis of the user ID and password supplied thereto (step S13), and notifies the local UI unit 301 of the authentication result (step S14).

Subsequently, the authentication unit 102 notifies the plug-in management unit 105 of the authentication result and the user ID used in the authentication (step S21), and accordingly the above-described plug-in display processing (step S20) is started. The plug-in management unit 105 instructs the license determination unit 109 to determine whether or not the user identified by the user ID has a license (step S22). The license determination unit 109 transmits the user ID to the license server 3 and requests a list of plug-in IDs identifying plug-ins for which the user identified by the user ID has a license (step S23). The license server 3 generates a requested list on the basis of the user ID transmitted thereto and transmits the list to the license determination unit 109 (step S24).

The license determination unit 109 supplies the received list to the plug-in management unit 105 (step S25), and the plug-in management unit 105 determines whether or not the plug-ins identified by the individual plug-in IDs included in the list are available (step S26). The plug-in management unit 105 determines that a plug-in installed in the image processing apparatus 10A is available, and supplies the list of plug-in IDs in which the plug-in determined to be available is reflected to the plug-in display/selection unit 103 (step S27). When the plug-in display/selection unit 103 instructs the local UI unit 301 to display the supplied list (step S28), the local UI unit 301 displays the list. At this time, the plug-in display/selection unit 103 instructs the local UI unit 301 to gray out the plug-in ID of an unavailable plug-in so that the user is unable to select the plug-in.

Subsequently, when the user performs an operation of selecting one of the plug-ins from the list displayed on the local UI unit 301 (step S31), the above-described UI screen display processing (step S30) is started. The local UI unit 301 supplies the plug-in ID of the selected plug-in and the user ID to the plug-in display/selection unit 103 (step S32). The plug-in display/selection unit 103 instructs the plug-in execution unit 104 to execute the plug-in identified by the plug-in ID (step S33). Upon receiving the instruction, the plug-in execution unit 104 requests setting information to the plug-in management unit 105 (step S34). Upon receiving the request, the plug-in management unit 105 determines whether or not the setting information set for the logged in user is stored in the image processing apparatus 10A in relation to the plug-in to be executed (step S35). For example, in a case where the user has selected "transfer a scan file", the plug-in management unit 105 determines whether or not the setting information illustrated in FIG. 7A is stored.

In a case where the setting information is not stored, the plug-in management unit 105 generates setting information that is predetermined for initial setting (step S36) in the exemplary embodiment. When the plug-in management unit 105 supplies the stored setting information or the generated setting information to the plug-in execution unit 104 (step S37), the plug-in execution unit 104 regards the supplied setting information as a candidate of setting information before the user makes a selection, and supplies the setting information to the plug-in display/selection unit 103 (step S38). The plug-in display/selection unit 103 determines the above-described display targets and arrangement order on the basis of the supplied setting information and instructs the local UI unit 301 to display the determined display targets in the determined arrangement order (step S39). The local UI unit 301 displays the display targets on the UI screen in accordance with the instruction. For example, in a case where the plug-in used by the user has a function of storing a scanned document in the cloud, the screen illustrated in FIG. 6A is displayed.

Subsequently, when the user performs an operation for using the function on the UI screen on the local UI unit 301 (step S41), the above-described setting information-related processing (step S40) is started. For example, on the screen illustrated in FIG. 6A, when user A changes "file name" to "purchase of management software" and then provides an execution instruction in the plug-in of transferring a scan file, the local UI unit 301 provides, via the plug-in display/selection unit 103 (step S42), an instruction based on the operation result to the plug-in execution unit 104 (step S43). The plug-in execution unit 104 executes processing in accordance with the instruction and supplies the setting information used at the time to the plug-in management unit 105 (step S44). In accordance with the supplied setting information, the plug-in management unit 105 updates the existing setting information (stored in the image processing apparatus 10A) that is related to the plug-in for which processing has been performed and that is set for the logged in user (step S45).

Subsequently, when the user performs an operation of finishing using the function, for example, when the user presses a "menu" button to return to the screen for selecting a plug-in (step S51), the above-described notification processing (step S50) is started. The local UI unit 301 notifies the plug-in display/selection unit 103 that the finishing operation has been performed (step S52), and the plug-in display/selection unit 103 instructs the plug-in execution unit 104 to finish execution of the plug-in (step S53). The plug-in execution unit 104 finishes execution of the plug-in and notifies the plug-in management unit 105 of that fact (step S54).

Upon receiving the notification, the plug-in management unit 105 obtains, in the exemplary embodiment, the plug-in ID, the user ID, and the date and time of the last update illustrated in FIG. 9 among the pieces of information stored in the header of the stored setting information (step S55). The plug-in management unit 105 multicasts, via the update notification unit 108 (step S56), the obtained information as update notification data indicating that the setting information has been updated to the image processing apparatuses 10B and 10C (step S57). The update notification data is data including the above-described function identification information (plug-in ID) and user identification information (user ID) transmitted by the update notification unit 108. In the above-described example, the user ID of user A and the plug-in ID of the plug-in of transferring a scan file (P001) are transmitted.

Subsequently, when the setting information transmission/reception units 107 of the image processing apparatuses 10B and 10C receive the update notification data transmitted from the image processing apparatus 10A, the above-described determination processing (step S60) is started. Each setting information transmission/reception unit 107 supplies the received update notification data to the plug-in management unit 105 of the corresponding apparatus (step S61). The plug-in management unit 105 determines whether or not the setting information associated with the same plug-in ID and user ID as those represented by the update notification data is stored in the apparatus. If the setting information is stored, the plug-in management unit 105 determines whether or not the date and time of the last update represented by the update notification data is more recent than the date and time when the stored information was last updated (step S62). Normally, the date and time of the last update represented by the update notification data is more recent, and thus the determination in step S62 is not necessarily performed.

Also, the plug-in management unit 105 inquires of the license server 3 about whether or not the user corresponding to the user ID represented by the update notification data is licensed to use the plug-in corresponding to the function identification information (plug-in ID) represented by the update notification data in the apparatus, that is, in the second information processing apparatus (step S63). If the plug-in management unit 105 determines in step S62 that the date and time of the last update represented by the update notification data is more recent and determines in step S63 that the user is licensed to use the plug-in, the plug-in management unit 105 instructs the setting information obtaining unit 106 to obtain the setting information (step S64).

In the example illustrated in FIG. 7C, the image processing apparatus 10B stores the plug-in ID P001 and the user ID of user A, and thus the date and time of the last update obtained from the image processing apparatus 10A is compared with the date and time of the last update stored in the image processing apparatus 10B. In a case where the date and time of the last update of the setting information for user A of the plug-in of transferring a scan file illustrated in FIG. 7A is compared with the date and time of the last update illustrated in FIG. 7C, the date and time of the last update of the setting information stored in the image processing apparatus 10A illustrated in FIG. 7A is more recent, and thus the plug-in management unit 105 of the image processing apparatus 10B provides an instruction to obtain the setting information from the image processing apparatus 10A.

Upon receiving the instruction, the setting information obtaining unit 106 transmits request data representing a request for the setting information to the image processing apparatus 10A (step S65). The request data includes a plug-in ID and a user ID that satisfy a condition that the plug-in is installed in the image processing apparatus 10B or 10C among the plug-ins represented by the update notification data transmitted from the image processing apparatus 10A, the setting information corresponding to the user ID represented by the update notification data is stored in the image processing apparatus 10B, and the date and time of the last update is earlier in the image processing apparatus 10B. Specifically, the request data includes the plug-in ID P001 of the plug-in of transferring a scan file and the user ID of user A.

When the setting information transmission/reception unit 107 of the image processing apparatus 10A receives the request data, the above-described update processing (step S70) is started. First, the setting information transmission/reception unit 107 instructs the plug-in management unit 105 to obtain the setting information requested in accordance with the received request data (the setting information associated with the plug-in ID P001 and the user ID of user A represented by the request data) in step S71. The plug-in management unit 105 obtains the setting information specified by the instruction (step S72) and supplies it to the setting information transmission/reception unit 107 (step S73).

Here, all the setting information for the scan file transfer plug-in regarding user A illustrated in FIG. 7A may be supplied, or a difference between the setting information regarding user A in the image processing apparatus 10A and the setting information regarding user A in the image processing apparatus 10B may be supplied. In the case of supplying the difference, the request data transmitted from the image processing apparatus 10B to the image processing apparatus 10A includes the date and time of the last update of the setting information for the scan file transfer plug-in for user A stored in the image processing apparatus 10B. The image processing apparatus 10A transmits the setting information for the plug-in for user A that is stored after the date and time of the last update obtained from the image processing apparatus 10B.

The setting information transmission/reception unit 107 of the image processing apparatus 10A transmits, to the image processing apparatus 10B as a request source, setting information data in which the header of the supplied setting information includes the plug-in ID and user ID represented by the request data (step S74). The setting information transmission/reception unit 107 of the image processing apparatus 10B as a request source receives the setting information data and supplies it to the plug-in management unit 105 of the image processing apparatus 10B (step S75). The plug-in management unit 105 updates the setting information stored in the image processing apparatus 10B in association with the plug-in ID and user ID represented by the supplied setting information data in accordance with the setting information represented by the setting information data (step S76). As a result, the setting information illustrated in FIG. 7C is changed to the setting information illustrated in FIG. 7D, and the setting information in the image processing apparatus 10A is reflected in the setting information in the image processing apparatus 10B.

Figure 13:
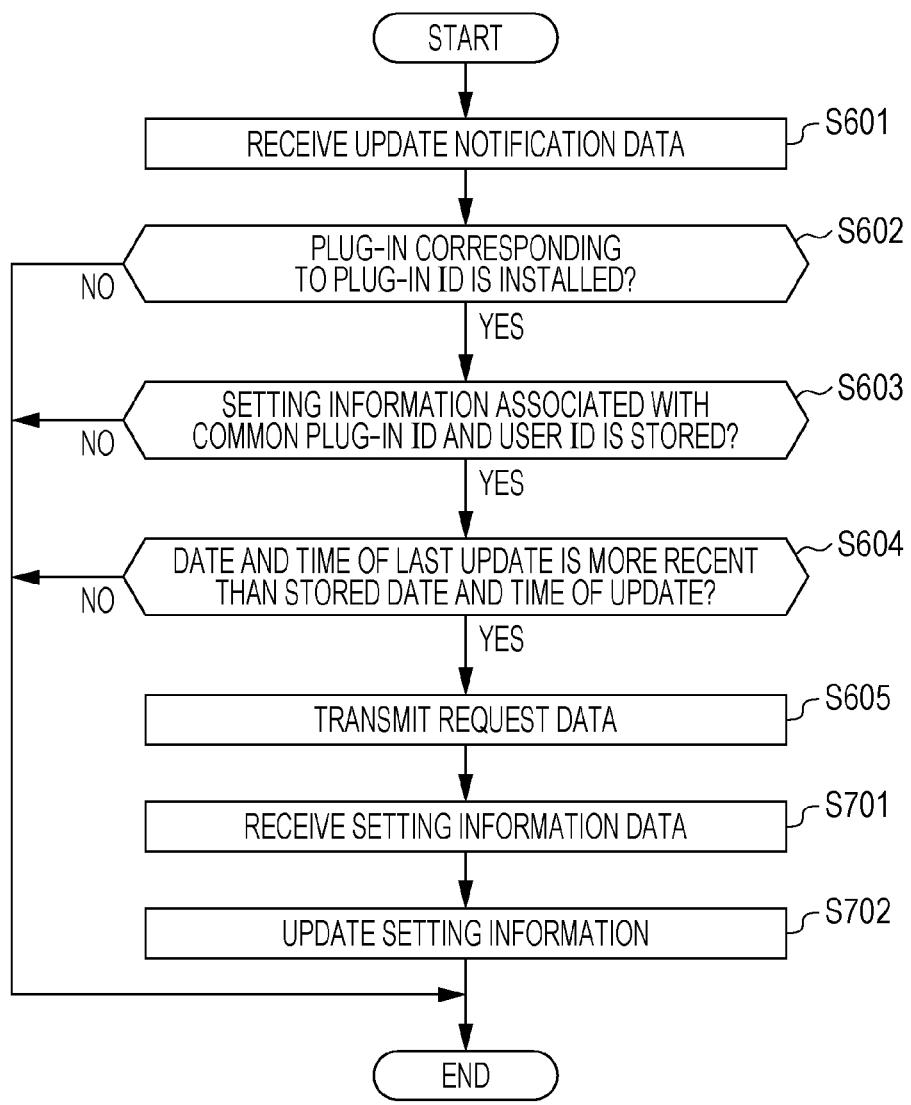
FIG. 13 is a diagram illustrating a flowchart of an operation procedure in determination processing and update processing.

FIG. 13 is a flowchart of the operation procedure of the determination processing (steps S61 to S65 in FIG. 12) and the update processing (steps S75 and S76 in FIG. 12). First, an image processing apparatus 10 receives update notification data (step S601). The image processing apparatus 10 determines whether or not the plug-in corresponding to the plug-in ID represented by the received update notification data has been installed in the image processing apparatus 10 (step S602). If the image processing apparatus 10 determines that the plug-in has not been installed (NO), the operation procedure ends. If the image processing apparatus 10 determines in step S602 that the plug-in has been installed (YES), the image processing apparatus 10 determines whether or not the setting information corresponding to the same plug-in ID and user ID as those represented by the received update notification data is stored in the image processing apparatus 10 (step S603). If the image processing apparatus 10 determines that the setting information is not stored (NO), the operation procedure ends.

If the image processing apparatus 10 determines in step S603 that the setting information is stored (YES), the image processing apparatus 10 determines whether or not the date and time of the last update represented by the update notification data is more recent than the date and time of the last update of the setting information stored in the image processing apparatus 10 (step S604). If the image processing apparatus 10 determines that the date and time of the last update is not more recent (NO), the operation procedure ends. If the image processing apparatus 10 determines in step S604 that the date and time of the last update is more recent (YES), the image processing apparatus 10 transmits request data representing a request for setting information to the transmission source of the update notification data (step S605). Subsequently, the image processing apparatus 10 receives setting information data transmitted from the transmission destination of the request data (step S701) and updates the setting information stored in the image processing apparatus 10 in accordance with the received setting information (step S702).

In the exemplary embodiment, in a case where a user who has used the image processing apparatus 10A uses the image processing apparatus 10B, the user uses the image processing apparatus 10B in a state where setting information in the image processing apparatus 10B (second setting information) has been updated with setting information used in the image processing apparatus 10A (first setting information). In this way, according to the exemplary embodiment, the setting information in the previously used apparatus is taken over to the next apparatus, and the same usability is obtained in the previous apparatus and the next apparatus. A mechanism for taking over the setting information may be implemented by providing a server apparatus that collects and accumulates setting information. However, in the exemplary embodiment, processing for taking over setting information is performed between the image processing apparatuses 10 that use the setting information, and thus a server apparatus for collecting and accumulating the setting information is not necessary.

2. Modification Example

The above-described exemplary embodiment is merely an example and may be modified in the following manner. The above-described exemplary embodiment and the following modification examples may be carried out in combination with one another if necessary.

2-1. Timing to Transmit Setting Information

In the above-described exemplary embodiment, the update notification unit 108 of a first information processing apparatus (in the exemplary embodiment, the image processing apparatus 10A) transmits function identification information and user identification information to a second information processing apparatus (in the exemplary embodiment, the image processing apparatuses 10B and 10C) and then transmits setting information in response to a request from the second information processing apparatus, but the exemplary embodiment is not limited thereto. The update notification unit 108 may collectively transmit the function identification information, the user identification information, and the setting information corresponding to these pieces of identification information and stored in the first information processing apparatus (that is, first setting information) to the second information processing apparatus.

In this case, upon receipt of the first setting information together with the plug-in ID and user ID from the first information processing apparatus, in a case where the plug-in identified by the plug-in ID and second setting information which is setting information for the plug-in set for the user identified by the user ID are stored in the second memory, the plug-in management unit 105 of the second information processing apparatus updates the second setting information in accordance with the first setting information that has been transmitted as the setting information corresponding to these pieces of identification information.

In this modification example, the operation from steps S64 to S75 illustrated in FIG. 12 for requesting setting information and transmitting the setting information in response to the request is unnecessary. On the other hand, in a case where the first information processing apparatus transmits setting information in response to a request from the second information processing apparatus as in the exemplary embodiment, the setting information is not transmitted if update of setting information is not necessary in the second information processing apparatus.

As described above, the timing to transmit setting information varies between this modification example and the exemplary embodiment. However, this modification example and the exemplary embodiment are the same in the following point. That is, when a plug-in ID and a user ID are transmitted from the first information processing apparatus, in a case where the plug-in identified by the plug-in ID and second setting information which is setting information for the plug-in set for the user identified by the user ID are stored in the second memory, the plug-in management unit 105 of the second information processing apparatus updates the second setting information in accordance with the first setting information (transmitted in response to a request from the second information processing apparatus in the exemplary embodiment, whereas transmitted together with the plug-in ID and user ID in this modification example) that has been transmitted as setting information corresponding to the pieces of identification information (plug-in ID and user ID).

2-2. Finish Using Plug-in

In the exemplary embodiment, the update notification unit 108 determines, when a screen for using a plug-in is switched to another screen, that the user has finished using the plug-in. However, the exemplary embodiment is not limited thereto. The update notification unit 108 may determine that the user has finished using the plug-in upon an operation of finishing the plug-in being performed by the user. This operation completely finishes the plug-in (for example, the plug-in is deleted from the RAM 12), whereas change of the screen does not always indicate that the plug-in has been finished.

In a case where the image processing apparatus 10 and a plug-in installed therein are used by a user who has logged in as in the exemplary embodiment, the update notification unit 108 may determine that the user has finished using the plug-in when the user has logged out.

Figure 14:
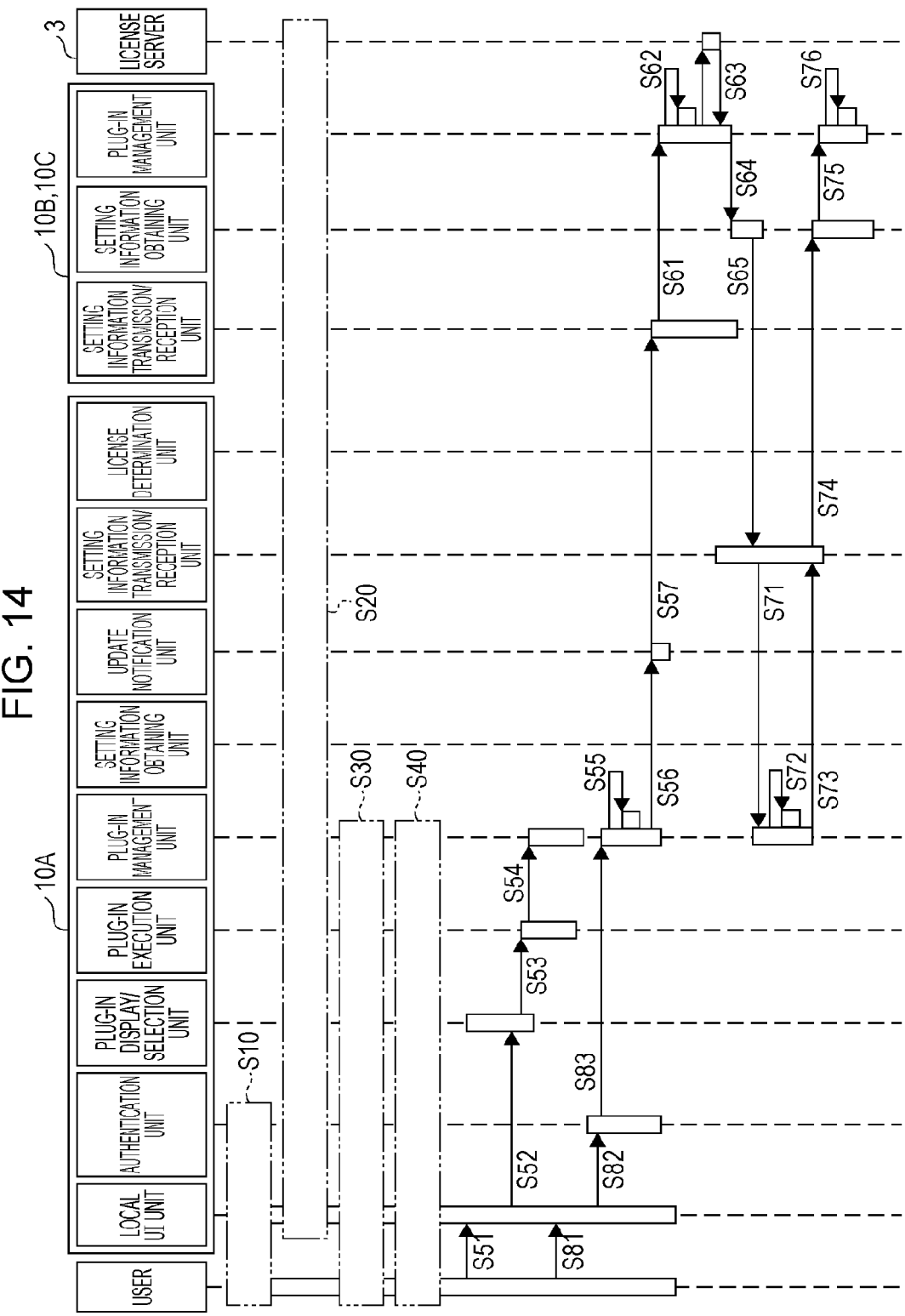
FIG. 14 is a diagram illustrating an example of the details of an operation procedure according to a modification example.

FIG. 14 illustrates an example of the details of an operation procedure according to this modification example. FIG. 14 illustrates, in a simple manner, the operation procedure of step S10 (authentication processing), step S20 (plug-in display processing), step S30 (UI screen display processing), and step S40 (setting information-related processing). In the example illustrated in FIG. 14, the operation is performed up to step S54 illustrated in FIG. 12 (notification about end of execution of a plug-in by the plug-in execution unit 104). In a case where plural plug-ins are executed, steps S51 to S54 are repeated.

Subsequently, the user performs a logout operation on the local UI unit 301 (step S81). The local UI unit 301 instructs the authentication unit 102 to perform logout processing (step S82). The authentication unit 102 performs logout processing in response to the instruction and notifies the plug-in management unit 105 that the logout processing has been completed (step S83). When the plug-in management unit 105 receives the notification, step S55 illustrated in FIG. 12 (obtainment of header information of setting information) and the subsequent steps are performed and the setting information is updated. For example, in a case where the above-described plug-in (transfer a scan file) and plug-in (print from the cloud server) have been executed, the setting information for both the plug-ins stored in the memory 302 is transmitted at the logout timing.

According to this modification example, a plug-in ID and a user ID are transmitted to a second information processing apparatus upon logout of the user. On the other hand, according to the exemplary embodiment, the plug-in ID and the user ID are transmitted to the second information processing apparatus upon the screen being switched by the user. In either of the exemplary embodiment and this modification example, the plug-in ID and the user ID are transmitted to the second information processing apparatus when the user finishes using the function of the first information processing apparatus.

2-3. Finish Using Plug-In

In the exemplary embodiment, the update notification unit 108 of a first information processing apparatus definitely transmits a plug-in ID and a user ID to a second information processing apparatus when a user finishes using a function of the first information processing apparatus, but the exemplary embodiment is not limited thereto. The update notification unit 108 transmits the plug-in ID and the user ID to the second information processing apparatus, for example, in a case where setting information corresponding to the plug-in ID and user ID to be transmitted (the above-described first setting information) has been updated in the first information processing apparatus after the preceding transmission of the plug-in ID and user ID.

Specifically, in the example illustrated in FIG. 7A, pieces of setting information respectively associated with the time stamps "3/1/20xx 15:00", "2/25/20xx 14:30", and "2/10/20xx 10:30" are stored for the plug-in ID "P001" and the user ID "U001". In a case where the setting information associated with the time stamp "2/25/20xx 14:30" is the setting information at the preceding transmission and in a case where the setting information associated with the time stamp "3/1/20xx 15:00" is the same as the setting information associated with the time stamp "2/25/20xx 14:30", the update notification unit 108 determines that the setting information corresponding to this set has not been updated, and does not transmit the plug-in ID and user ID to the second information processing apparatus even when the user finishes using the function.

2-4. Date and Time of Update of Plug-in

If the version of a plug-in is upgraded, the plug-in stored in an image processing apparatus 10 is updated. Whether or not setting information is to be requested may be determined on the basis of the date and time of the update. In this modification example, the update notification unit 108 transmits, when transmitting a plug-in ID and a user ID, the date and time of update of the plug-in identified by the plug-in ID.

The setting information obtaining unit 106 of an image processing apparatus 10 requests setting information in a case where the function (plug-in) identified by the plug-in ID obtained in this manner is stored in the memory of the image processing apparatus 10 (second memory) and in a case where the obtained date and time of update is more recent than the date and time when the plug-in was updated. Thus, the setting information obtaining unit 106 does not request the setting information on the image processing apparatus 10 that has a plug-in whose date and time of update is before the date and time of update of the plug-in of the image processing apparatus 10. An old date and time of update normally means an old version. Thus, the setting information may also be old, which may be inappropriate for the image processing apparatus 10.

For example, there is a probability that the following situation will occur. That is, although setting information is increased when the version is upgraded (to maintain compatibility, it is rare to decrease setting information in a new version), the second setting information is updated in accordance with the first setting information that includes less setting information of an old version, and the increased setting information of the new version is deleted.

2-5. Whether or not to Update

In an image processing apparatus 10, even if setting information is transmitted thereto from another image processing apparatus 10, it may be impossible to update setting information in the image processing apparatus 10, for example, in a case where the function for which the setting information is set is not activated or in a case where the UI screen of the function is operated by another user. Thus, the setting information obtaining unit 106 may request first setting information in a case where the state of the function for which the setting information is to be requested is a state in which second setting information (setting information stored in the image processing apparatus 10) is able to be updated in accordance with the first setting information to be requested.

In a case where the setting information is not updatable, a request for setting information may be made after it becomes possible to update the setting information. In a case where the setting information for which a request is to be made is not updatable, the setting information obtaining unit 106 notifies the plug-in execution unit 104 of that fact. In a case where second setting information is not updatable in accordance with first setting information that is to be requested by the setting information obtaining unit 106, the plug-in execution unit 104 changes the state of the image processing apparatus 10 so that the second setting information becomes updatable.

In a case where the setting information is not updatable because the function is not activated, the plug-in execution unit 104 activates the function to make it possible to update the setting information. In a case where the setting information is not updatable because the UI screen is operated by another user, the plug-in execution unit 104 temporarily stops acceptance of an operation on the UI screen to make it possible to update the setting information. At this time, a message indicating that the setting information is being updated is displayed on the UI screen. After changing the state, the plug-in execution unit 104 notifies the setting information obtaining unit 106 of that fact. The setting information obtaining unit 106 requests setting information after the state has been changed by the plug-in execution unit 104 in this manner. Accordingly, in a case where it is not possible to update the second setting information with the first setting information, the setting information is updated at an early timing compared to a case where the state is not changed by the plug-in execution unit 104.

Setting information may be managed by the plug-in management unit 105 indirectly or directly. In a case where the plug-in management unit 105 indirectly manages setting information, each function holds (includes) setting information, and the plug-in management unit 105 provides an instruction to update the setting information via the plug-in execution unit 104. On the other hand, in a case where the plug-in management unit 105 directly manages setting information, the setting information is stored in the area of a corresponding function in the memory 302. In a case where each function includes setting information, it may be impossible to update the setting information when the function is not activated. In this case, in the image processing apparatus 10B (second information processing apparatus), the plug-in management unit 105 checks the state of the function for which the setting information is to be updated before requesting setting information to the image processing apparatus 10A (first information processing apparatus). Specifically, the check is performed by the plug-in management unit 105 after step S62 in FIG. 12 and before a request for the setting information is made.

As a result of the check, if there is an inactivated function among functions for which setting information is to be updated, the plug-in management unit 105 instructs the plug-in execution unit 104 to activate the inactivated function. In response to the instruction, the plug-in that implements the function for which the setting information is to be updated is activated, and the function is activated. After the function is activated, the setting information transmission/reception unit 107 requests setting information to the image processing apparatus 10A in response to an instruction from the plug-in management unit 105. The activation state of the function may be checked in response to a request from the image processing apparatus 10A (first information processing apparatus) after the image processing apparatus 10A has received a request for obtaining setting information from the image processing apparatus 10B.

Specifically, in step S65 in FIG. 12, the setting information transmission/reception unit 107 of the image processing apparatus 10A (first information processing apparatus) receives a request for setting information from the image processing apparatus 10B (second information processing apparatus). After receiving the request, the setting information transmission/reception unit 107 of the image processing apparatus 10A transmits a list of plug-in IDs to the image processing apparatus 10B and requests check of the state of the function for which setting information is to be updated, in response to an instruction from the plug-in management unit 105.

The setting information transmission/reception unit 107 of the image processing apparatus 10B receives the request, and the plug-in management unit 105 checks the activation state of the functions described in the list of plug-in IDs. As a result of the check, if there is an inactivated function among functions for which setting information is to be updated, the plug-in management unit 105 of the image processing apparatus 10B requests the plug-in execution unit 104 to activate the function. After the function for which setting information is to be updated has been activated, the plug-in management unit 105 requests again setting information to the setting information transmission/reception unit 107. In a case where activation of the function is not able to be performed in the image processing apparatus 10B, the memory 302 of the image processing apparatus 10B may temporarily store the setting information received from the image processing apparatus 10A, and may update the setting information after the function has been activated in the image processing apparatus 10B.

2-6. Determination of License

In the exemplary embodiment, the image processing apparatus 10 on the side of updating setting information, that is, a second information processing apparatus, determines whether or not the second information processing apparatus has a license to use the plug-in corresponding to the setting information (step S63 in FIG. 12). Alternatively, the determination may be performed by a first information processing apparatus (the image processing apparatus 10 on the side of transmitting setting information). In this case, the license determination unit 109 of the first information processing apparatus determines whether or not a license is granted to use, in the second information processing apparatus to which a plug-in ID and a user ID are to be transmitted by the update notification unit 108, the plug-in identified by the plug-in ID. In this modification example, each image processing apparatus 10 stores apparatus IDs of the other apparatuses, and the license determination unit 109 makes an inquiry of the license server 3 about whether or not a license is granted in another apparatus (a second information processing apparatus in a case where the apparatus itself is a first information processing apparatus) by using the apparatus IDs, plug-in IDs, and user IDs. After determining the license, the license determination unit 109 notifies the update notification unit 108 of the apparatus of the determination result.

The update notification unit 108 of the first information processing apparatus transmits the plug-in ID and user ID to the second information processing apparatus that has been determined, by the license determination unit 109 of the first information processing apparatus, to have a license. Thus, the plug-in ID and user ID are not transmitted to the second information processing apparatus that has been determined not to have a license. In this modification example, the load of processing for determining whether or not a license is granted is concentrated on the first information processing apparatus. On the other hand, if the second information processing apparatus determines whether or not a license is granted, as in the exemplary embodiment, each second information processing apparatus only has to perform determination on the own apparatus, and therefore concentration of processing to a certain apparatus is prevented.

2-7. Version of Plug-In

At the time of receiving a notification about update of setting information and determining whether or not to request the setting information, the version of a program (in the exemplary embodiment, a plug-in) may be considered. In this modification example, the update notification unit 108 of the first information processing apparatus transmits a plug-in ID and a user ID and also transmits version information of the plug-in that is identified by the plug-in ID and that is installed in the first information processing apparatus. The setting information obtaining unit 106 of the second information processing apparatus requests setting information in a case where the version information of the plug-in obtained from the first information processing apparatus and version information of the plug-in installed in the second information processing apparatus satisfy a predetermined condition.

In this modification example, the condition is satisfied in a case where the versions represented by both the pieces of version information match. In this case, only in a case where an image processing apparatus 10 receives a notification about update of setting information (first setting information) from another image processing apparatus 10 having the same plug-in version, the second setting information is updated in accordance with the first setting information. Alternatively, for example, it may be determined that the condition is satisfied in a case where the version of a plug-in represented by transmitted version information is newer or older. Alternatively, it may be determined that the condition is satisfied in a case where a difference between the version of a plug-in installed in the apparatus and the version of a plug-in installed in the other apparatus is within a predetermined range (for example, the number of times of major version upgrade is two). According to this modification example, the version of a plug-in that is installed in an apparatus storing setting information (first setting information) to be used to update setting information in the second information processing apparatus (second setting information) is selected in accordance with a condition.

2-8. Upgrade of Plug-In

In the above-described modification example, setting information in an apparatus is not updated in a case where the version of a plug-in installed in the apparatus is old. In that case, the setting information may be updated after upgrading the plug-in. In this modification example, for example, the plug-in management unit 105 of an image processing apparatus 10 upgrades a plug-in. When the update notification unit 108 of a first information processing apparatus transmits a plug-in ID, a user ID, and version information of a plug-in to a second information processing apparatus as in the above-described modification example, the IDs and version information are supplied to the plug-in management unit 105 of the second information processing apparatus.

The plug-in management unit 105 upgrades the plug-in in a case where the version represented by the received version information of the plug-in is newer than the version of the plug-in installed in the second information processing apparatus. At this time, the version may be upgraded to the version represented by the received version information of the plug-in or to the latest version. The plug-in management unit 105 downloads the plug-in of the corresponding version from a plug-in server 5 illustrated in FIG. 15 and installs it in the second information processing apparatus.

The plug-in server 5 stores plug-ins of various versions and transmits, in response to a request from an external apparatus, a plug-in of a requested version and data that is necessary to install the plug-in to the request source. The plug-in management unit 105 performs upgrading by using the data received from the plug-in server 5 and updates setting information after the upgrading.

Figure 15:
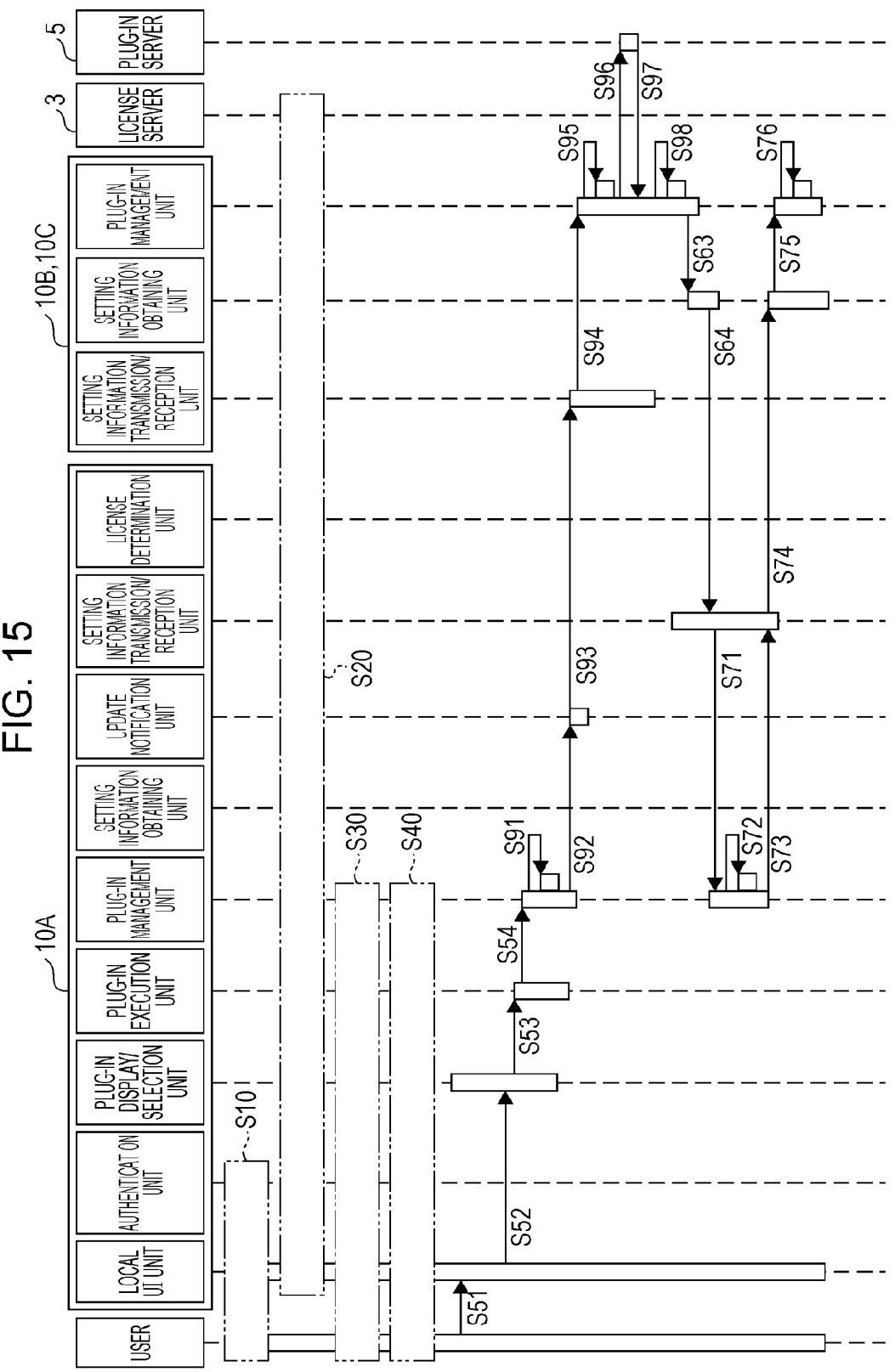
FIG. 15 is a diagram illustrating an example of the details of an operation procedure according to a modification example.

FIG. 15 illustrates an example of the details of an operation procedure according to this modification example. FIG. 15 illustrates the operation procedure of steps S10 to S40 in a simple manner. After step S40, operation is performed up to step S54 illustrated in FIG. 12 (notification about end of execution by the plug-in execution unit of the first information processing apparatus). Upon receipt of this notification, the plug-in management unit 105 obtains a plug-in ID, a user ID, the date and time of the last update, and version information of the plug-in (step S91) and transmits update notification data including them in the header to the image processing apparatuses 10B and 10C (step S93) via the update notification unit 108 (step S92). The setting information transmission/reception unit 107 of each of the image processing apparatuses 10B and 10C supplies the received update notification data to the plug-in management unit 105 of the apparatus (step S94).

The plug-in management unit 105 compares, if the setting information associated with the same plug-in ID and user ID as those represented by the update notification data is stored in the apparatus, the version information with the version information represented by the update notification data (step S95). If the version of the plug-in in the apparatus is older, the plug-in management unit 105 requests the plug-in server 5 for data for upgrading the plug-in to the version represented by the update notification data (step S96). The plug-in server 5 transmits the data for upgrading to the request source (step S97), and the plug-in management unit 105 upgrades the plug-in by using the received data for upgrading (step S98). After the plug-in has been upgraded by the plug-in management unit 105, step S64 (instruction to obtain setting information) and the subsequent steps are performed, so that the setting information is updated.

Figure 16:
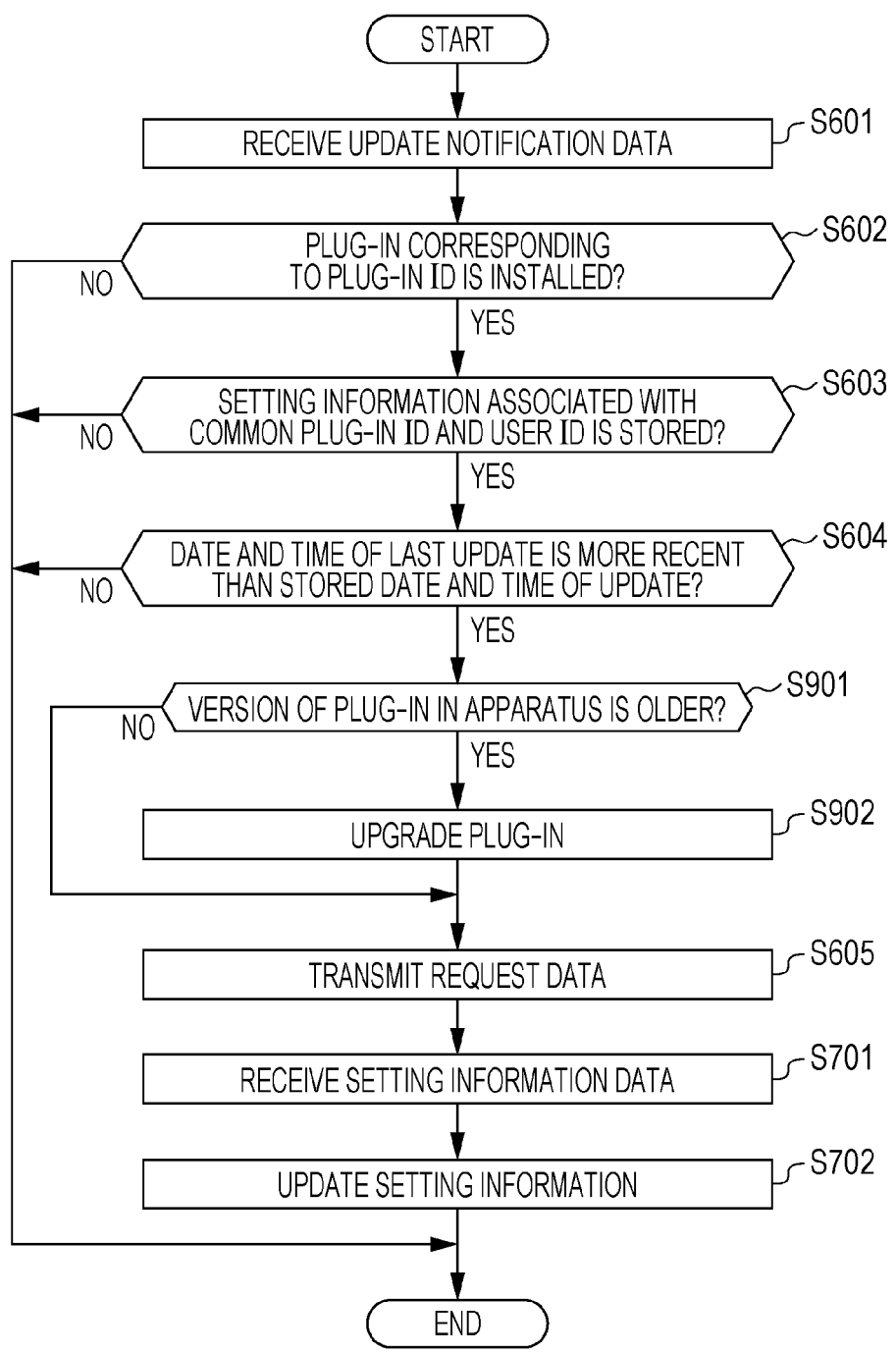
FIG. 16 is a diagram illustrating an example of an operation procedure of a second information processing apparatus according to a modification example.

FIG. 16 illustrates an example of an operation procedure of a second information processing apparatus according to this modification example. The image processing apparatus 10 serving as the second information processing apparatus first performs step S601 (receive update notification data) to step S604 (determine the date and time of the last update) illustrated in FIG. 13. If it is determined that the date and time of the last update is more recent than that stored in the image processing apparatus 10 (YES in step S604), the image processing apparatus 10 determines whether or not the version of the plug-in installed in the image processing apparatus 10 is older than the version represented by the update notification data (step S901).

If it is determined that the version of the plug-in installed in the image processing apparatus 10 is older (YES in step S901), the image processing apparatus 10 upgrades the plug-in (step S902). After the upgrading or if it is determined that the version of the plug-in installed in the image processing apparatus 10 is not older (NO in step S901), the image processing apparatus 10 performs step S605 (transmit request data) and the subsequent steps illustrated in FIG. 13. If the version of the plug-in is old, setting information in the plug-in of a new version is not used well in some cases. However, in this modification example, the setting information is updated after the version of the plug-in has been upgraded, and thus the setting information is updated to setting information suitable for the version of the plug-in.

2-9. Specific Item

Some of pieces of setting information may cause inconvenience to the user who uses a function if a specific item is not common. Examples of the specific item include a uniform resource locator (URL) for storing a scanned document. If second setting information is updated with first setting information including a different URL, different information will be presented when the user refers to the URL in the setting information after the update. If the information is not suitable for using the function, it may be necessary for the user to input an original URL.

In this modification example, in a case where a specific item in setting information (first setting information) obtained from a first information processing apparatus in response to a request from the setting information obtaining unit 106 is the same as a specific item in setting information (second setting information) that is stored in the memory 302 (second memory) of a second information processing apparatus and that is associated with the user and function corresponding to the first setting information, the plug-in management unit 105 of the second information processing apparatus updates the second setting information with the first setting information. If the specific item is the above-described URL and if the first setting information including a URL different from the URL included in the second setting information is transmitted, the plug-in management unit 105 does not update the second setting information with the first setting information.

2-10. Limitation of Transmission Destination

In the exemplary embodiment, the setting information transmission/reception unit 107 and the update notification unit 108 multicast update notification data and setting information data to the other image processing apparatuses 10 in the same sub-network serving as second information processing apparatuses, but the exemplary embodiment is not limited thereto. The setting information transmission/reception unit 107 and the update notification unit 108 may broadcast these pieces of data, or may transmit these pieces of data to second information processing apparatuses belonging to a predetermined group among plural second information processing apparatuses. Examples of the predetermined group include a group of image processing apparatuses 10 that are installed in the same floor or building and a group of image processing apparatuses 10 owned by the same owner though the apparatuses are distant from one another. Alternatively, a group of image processing apparatuses 10 connected to the same license server or plug-in server, or a group of image processing apparatuses 10 that are frequently used by users (determined for each user) may be used. Alternatively, a group constituted by registering addresses of image processing apparatuses in advance may be used. In this modification example, setting information is taken over through update among apparatuses belonging to the same group. The group may be freely determined.

2-11. Initial Setting

In the exemplary embodiment, in a case where a plug-in is executed for the first time and setting information is not stored in the memory 302, setting information that is predetermined for initial setting is generated and used, but the exemplary embodiment is not limited thereto, and setting information for another apparatus may be used. Hereinafter, a description will be given of a case where a plug-in is executed for the first time in the image processing apparatus 10B, which is an example of a second information processing apparatus.

In a case where an instruction to activate a function is provided from a user and in a case where setting information that is set for the user in relation to the function is not stored in the memory 302 (second memory) of the image processing apparatus 10B (a second information processing apparatus in this example), the setting information obtaining unit 106 of the image processing apparatus 10B makes an inquiry of a first information processing apparatus about whether or not the setting information is stored and about the date and time of update. The setting information obtaining unit 106 transmits inquiry data representing the inquiry to the first information processing apparatus.

The inquiry data transmitted by the setting information obtaining unit 106 is supplied to the setting information transmission/reception unit 107 of the first information processing apparatus (for example, the image processing apparatus 10A). The setting information transmission/reception unit 107 transmits, in a case where the setting information obtaining unit 106 of the second information processing apparatus makes an inquiry of the setting information transmission/reception unit 107 about whether or not setting information is stored and about the date and time of update of the setting information and in a case where the setting information is stored in the memory 302 (first memory) of the image processing apparatus 10A, the date and time of update of the setting information to the second information processing apparatus as the inquiry source. The date and time of update transmitted by the setting information transmission/reception unit 107 is supplied to the setting information obtaining unit 106 of the second information processing apparatus.

The setting information obtaining unit 106 requests the setting information to an apparatus that has transmitted the latest date and time of update among dates and times of update obtained in response to the inquiry. For example, in a case where dates and times of update t41, t42 (date and time after t41), and t43 (date and time after t42) are transmitted from three image processing apparatuses 10, the setting information obtaining unit 106 requests setting information to the image processing apparatus 10 that has transmitted the latest date and time of update t43. The setting information transmission/reception unit 107 of the image processing apparatus 10 transmits the setting information to the apparatus as the request source in response to the request for the setting information.

The setting information transmitted from the setting information transmission/reception unit 107 is supplied to the memory 302 (second memory) of the second information processing apparatus. The memory 302 stores the setting information obtained from the first information processing apparatus in response to the request from the setting information obtaining unit 106. The setting information stored in this manner is initial setting information related to the function implemented by a plug-in that is executed in the second information processing apparatus for the first time. In this modification example, the latest setting information among pieces of setting information stored in the other apparatuses is used as initial setting information. Thus, processing using the taken over setting information is performed also in the function that is used by a user in the second information processing apparatus.

Figure 17:
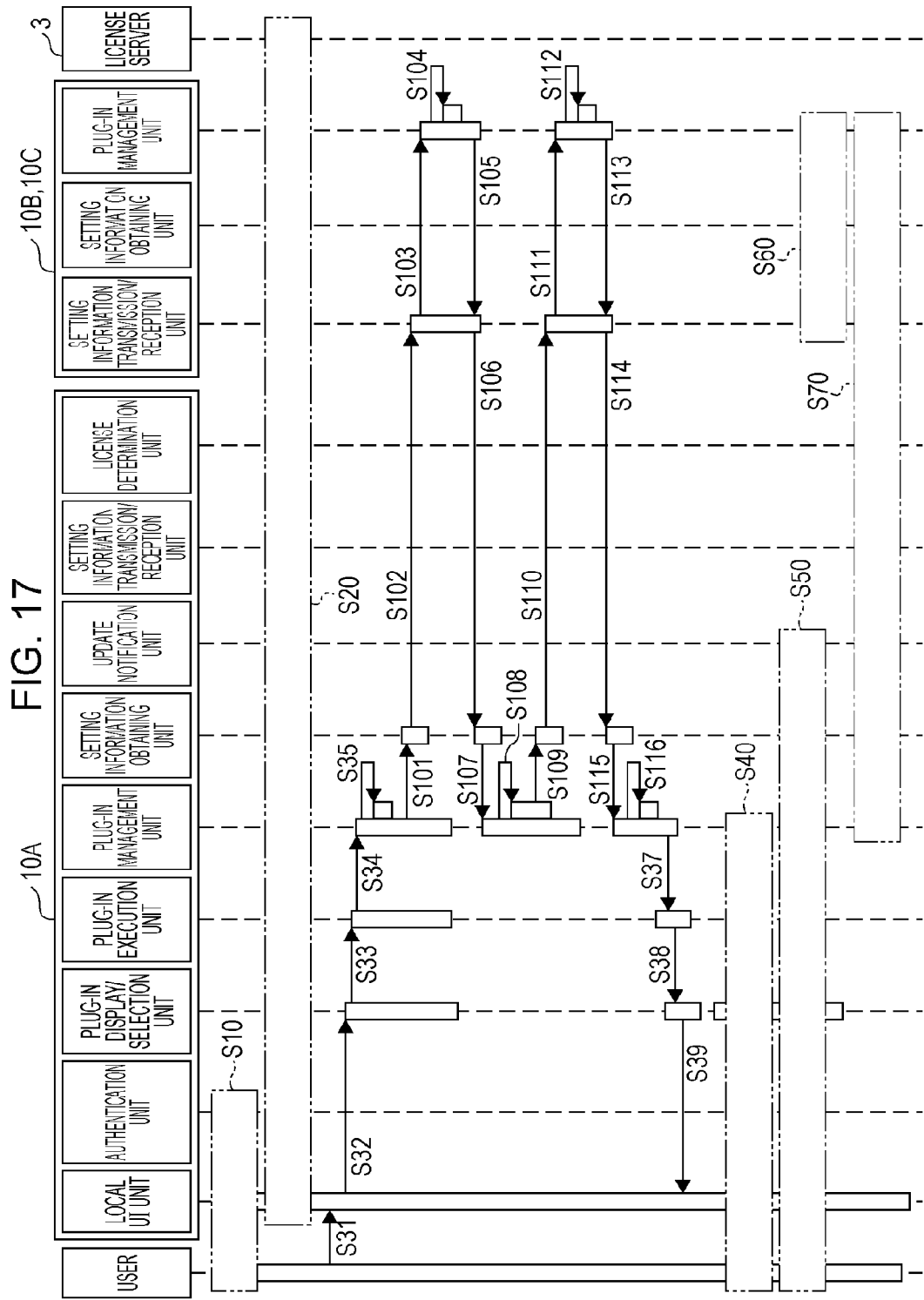
FIG. 17 is a diagram illustrating an example of the details of an operation procedure according to a modification example.

FIG. 17 illustrates an example of the details of an operation procedure according to this modification example. In this example, a description will be given under the assumption that the image processing apparatus 10A is an example of a second information processing apparatus, and the image processing apparatuses 10B and 10C are examples of a first information processing apparatus. FIG. 17 illustrates the operation procedure of steps S10, S20, and S40 to S70 in a simple manner. After step S20, operation is performed up to step S35 (determination of setting information) illustrated in FIG. 12. In a case where the setting information is not stored in the image processing apparatus 10A, the plug-in management unit 105 of the image processing apparatus 10A requests, via the setting information obtaining unit 106 (step S101), the plug-in ID, user ID, and the date and time of the last update illustrated in FIG. 9 among the pieces of information stored in the header of the setting information (step S102).

Upon receipt of the request made in step S102, the setting information transmission/reception unit 107 of the image processing apparatus 10B notifies the plug-in management unit 105 of the image processing apparatus 10B of the request (step S103). The plug-in management unit 105 obtains, from the header of setting information including the same plug-in ID and user ID as those associated with the requested information, the plug-in ID, the user ID, and the date and time of the last update (step S104). The plug-in management unit 105 transmits, via the setting information transmission/reception unit 107 (step S105), the obtained information to the image processing apparatus 10A (step S106).

Upon receipt of the information transmitted in step S106, the setting information obtaining unit 106 of the image processing apparatus 10A supplies the information to the plug-in management unit 105 of the image processing apparatus 10A (step S107). If steps S102 to S107 are performed on plural image processing apparatuses 10, plural pieces of information are supplied to the plug-in management unit 105. The plug-in management unit 105 compares the pieces of information and determines the setting information whose header includes the latest date and time of the last update as the setting information to be obtained (step S108). The plug-in management unit 105 requests, to the image processing apparatus 10 that stores the determined setting information via the setting information obtaining unit 106 (step S109), the setting information whose header includes the plug-in ID and user ID supplied in step S107 (step S110).

The setting information transmission/reception unit 107 of the image processing apparatus 10 that has received the request transmitted in step S110 notifies the plug-in management unit 105 of the image processing apparatus 10 of the request (step S111). The plug-in management unit 105 obtains the requested setting information from the memory 302 of the image processing apparatus 10 (step S112) and transmits, via the setting information transmission/reception unit 107 (step S113), the obtained setting information to the image processing apparatus 10A (step S114). The setting information obtaining unit 106 of the image processing apparatus 10A receives the setting information transmitted in step S114 and supplies the setting information to the plug-in management unit 105 of the image processing apparatus 10A (step S115). The plug-in management unit 105 stores the supplied setting information in the memory 302 of the image processing apparatus 10A (step S116). After that, operation is performed from step S37 (supply of setting information to the plug-in execution unit 104) illustrated in FIG. 12.

2-12. Determination of Display Target

The plug-in display/selection unit 103 of an image processing apparatus 10 may consider the capacity of the memory 302 of the image processing apparatus 10 when determining a display target among candidates of setting information. For example, in a case where the data amount of a display target to be determined exceeds the capacity of the memory 302, the plug-in display/selection unit 103 narrows down the display target so that the data amount of the display target becomes within the capacity. In this case, the plug-in display/selection unit 103 adds data amounts in the order of determining the arrangement order of display targets, and determines the candidates of setting information within the capacity as the display target. The plug-in display/selection unit 103 may narrow down the display target so that the data amount becomes within the predetermined percentage of the capacity of the memory 302. For example, in a case where an address book indicating a destination is set for each user and in a case where the number of received entries is larger than the number of entries that may be held in the apparatus, an entry over an upper limit value is not held.

2-13. Program Other than Plug-in

In the exemplary embodiment, a description has been given of a case where setting information for a plug-in is updated. Alternatively, setting information for a program other than a plug-in may be updated. The program for which setting information is updated may be, for example, a program for expanding a function other than a plug-in (add-on or extension) or may be a program that is installed in advance at the time of manufacturing, such as firmware. That is, any program may be used as long as setting information is set for each user in relation to a function implemented by the program.

2-14. License for Using Function

In the above-described exemplary embodiment and modification example, a license is granted for a plug-in, and installation, upgrading, and transmission and obtainment of version information are performed for each plug-in, but the exemplary embodiment is not limited thereto. For example, a license may be granted for a function implemented by a plug-in. Also, installation or upgrading may be performed for each function implemented by the plug-in. Also, the version of a function implemented by a plug-in may be managed, and information representing the managed version (version information of the function) may be transmitted or obtained.

2-15. Category of Invention

An exemplary embodiment of the present invention may be implemented by various information processing apparatuses such as an image processing apparatus, a user apparatus, a license server, and a plug-in server, and an information processing system including the information processing apparatuses. Also, an exemplary embodiment of the present invention may be implemented by a non-transitory computer readable medium storing an information processing program causing a computer that controls the information processing apparatuses to function as the above-described units. The information processing program is provided in the form of a recording medium such as an optical disc storing the program, or is provided through a communication line such as the Internet and is downloaded and installed to a computer so as to be available therein.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system including a first information processing apparatus and a second information processing apparatus that are configured to use setting information, the setting information being information that is stored for each user and that designates a condition for executing a function,
   the first information processing apparatus comprising:
      at least a first processor configured to execute a transmission unit configured to transmit information including at least function identification information and user identification information to the second information processing apparatus, the function identification information identifying a function for which first setting information, which is the setting information stored in the first information processing apparatus, is used, and the user identification information identifying a user associated with the function identification information, and
   the second information processing apparatus comprising:
      at least a second processor configured to execute:
         a request unit configured to make a request for the first setting information to the first information processing apparatus in a case where second setting information is stored in the second information processing apparatus, the second setting information corresponding to the user identification information and being setting information for a function that is identified by function identification information; and
         an update unit configured to update the second setting information in accordance with the first setting information that has been transmitted from the first information processing apparatus in response to the request made by the request unit.

2. The information processing system according to claim 1, wherein
   the transmission unit is also configured to transmit, when transmitting the information including at least the function identification information and the user identification information, a date and time of update of the setting information for the function identified by the function identification information, and
   the request unit is configured to make the request in a case where the function identified by the function identification information is stored in the second information processing apparatus and in a case where the date and time of update obtained from the first information processing apparatus is more recent than a date and time when setting information for the function was previously updated.

3. The information processing system according to claim 1, wherein the request unit is configured to check, before making the request, a state of a function for which setting information is to be updated, and to make the request for the first setting information in a case where the state of the function for which setting information is to be requested is a state where the setting information is able to be updated.

4. The information processing system according to claim 1, wherein the at least the second processor is further configured to execute:
   an execution unit configured to execute the function and to change, in a case where the request unit checks a state of the function for which setting information is to be updated and in a case where the function is not activated or is not in an effective state, the state of the function so that the setting information is able to be updated,
   wherein the request unit is configured to make the request after the execution unit has changed the state.

5. The information processing system according to claim 1, wherein the at least the second processor is further configured to execute:
   a determination unit configured to determine whether or not a license has been granted to use, in the second information processing apparatus, the function identified by the function identification information obtained from the first information processing apparatus,
   wherein the request unit is configured to make the request in a case where the determination unit determines that the license has been granted.

6. The information processing system according to claim 1, wherein
   the transmission unit is also configured to transmit, when transmitting the information including at least the function identification information and the user identification information, version information of a function that implements the function identified by the function identification information and that is installed in the first information processing apparatus, and
   the request unit is configured to make the request in a case where the version information of the function obtained from the first information processing apparatus and version information of the function installed in the second information processing apparatus satisfy a predetermined condition.

7. The information processing system according to claim 6, wherein the update unit is configured to, in a case where a version represented by the version information of the function obtained from the first information processing apparatus is newer than a version of the function installed in the second information processing apparatus, upgrade the function and update the setting information after the upgrading.

8. The information processing system according to claim 1, wherein the transmission unit is configured to transmit information including at least the function identification information, the user identification information, and the first setting information to the second information processing apparatus.

9. The information processing system according to claim 1, wherein the transmission unit is configured to transmit, in response to a user finishing using the function, information including at least the function identification information identifying the function and the user identification information identifying the user.

10. The information processing system according to claim 9, wherein the transmission unit is configured to determine that the user has finished using the function in response to a screen for using the function being switched to another screen.

11. The information processing system according to claim 1, wherein the transmission unit is configured to transmit, to the second information processing apparatus, the information including at least the function identification information and the user identification information to be transmitted in a case where the first setting information corresponding to the information is updated in the first information processing apparatus after a preceding transmission of the information.

12. The information processing system according to claim 1, the second information processing apparatus further comprising:
 a display controller configured to, in response to a user for which the setting information is set using the function corresponding to the setting information on the basis of the setting information that has been updated by the update unit and stored in the second information processing apparatus, determine a display target among candidates of the setting information for the function or an arrangement order in which the candidates are displayed and cause a display to display the determined display target or cause the display to display the candidates in the determined arrangement order,
 wherein the at least the second processor is further configured to execute an execution unit configured to execute the function corresponding to the setting information by using a candidate selected by the user from among the candidates of the setting information, and
 wherein the second information processing apparatus further comprises a memory configured to store the candidate used for processing by the execution unit as the setting information.

13. The information processing system according to claim 12, wherein the display controller is configured to determine a history of setting information that has previously been set for the user as the display target and determine the arrangement order of the history in accordance with a frequency at which the setting information has previously been set.

14. The information processing system according to claim 1, wherein the update unit has a function of managing the setting information and is configured to update the setting information by using the function.

15. The information processing system according to claim 1, wherein the at least the second processor is further configured to execute:
 an execution unit configured to execute the function corresponding to the setting information by using a candidate selected by the user from among candidates of the setting information and to manage the setting information,
 wherein the update unit is configured to update the setting information by requesting the execution unit to update the setting information.

16. The information processing system according to claim 1, wherein the update unit is configured to update the second setting information with the first setting information in a case where the first setting information and the second setting information have an identical specific item.

17. The information processing system according to claim 1, wherein the second information processing apparatus is one of a plurality of second information processing apparatuses, and the transmission unit is configured to perform the transmission to one or more second information processing apparatuses that belong to a predetermined group among the plurality of second information processing apparatuses.

\* \* \* \* \*